United States Patent
Wu et al.

(10) Patent No.: US 12,126,556 B2
(45) Date of Patent: Oct. 22, 2024

(54) METHOD AND DEVICE IN NODES USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 425 days.

(21) Appl. No.: 17/571,570

(22) Filed: Jan. 10, 2022

(65) Prior Publication Data

US 2022/0224469 A1 Jul. 14, 2022

(30) Foreign Application Priority Data

Jan. 11, 2021 (CN) .......................... 202110029619.5

(51) Int. Cl.
*H04W 76/40* (2018.01)
*H04L 5/00* (2006.01)
*H04W 72/044* (2023.01)
*H04W 72/0453* (2023.01)

(52) U.S. Cl.
CPC .......... *H04L 5/0048* (2013.01); *H04L 5/0007* (2013.01); *H04W 72/0453* (2013.01); *H04W 72/0466* (2013.01)

(58) Field of Classification Search
None
See application file for complete search history.

(56) References Cited

U.S. PATENT DOCUMENTS

| | | | |
|---|---|---|---|
| 2020/0100311 A1* | 3/2020 | Cirik | H04W 72/23 |
| 2021/0307102 A1* | 9/2021 | Babaei | H04W 36/0058 |
| 2022/0131591 A1* | 4/2022 | Huang | H04L 5/0051 |
| 2022/0190906 A1* | 6/2022 | Haghighat | H04B 7/06964 |
| 2023/0038936 A1* | 2/2023 | Zheng | H04L 1/1854 |

* cited by examiner

Primary Examiner — Ajit Patel

(57) ABSTRACT

The present disclosure provides a method and device in a node for wireless communications. A first node receives a first reference signal group; maintains a first counter; and transmits a target signal; a measurement performed on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal; the second signal is used to determine a second reference signal.

20 Claims, 5 Drawing Sheets

METHOD AND DEVICE IN NODES USED FOR WIRELESS COMMUNICATION

CROSS REFERENCE TO RELATED APPLICATIONS

This application claims the priority benefit of Chinese Patent Application 202110029619.5, filed on Jan. 11, 2021, the full disclosure of which is incorporated herein by reference.

BACKGROUND

Technical Field

The present disclosure relates to transmission methods and devices in wireless communication systems, and in particular to a method and device of radio signal transmission in a wireless communication system supporting cellular networks.

Related Art

How to support transmission of multicast and broadcast services under 5G architecture was discussed in New Radio (NR) Release (R) 17. In traditional Long-Term Evolution (LIE) and Long-Term Evolution Advanced (LTE-A) systems, a base station supports a terminal in receiving multicast and groupcast services through methods of Multicast Broadcast Single Frequency Network (MBSFN) and Single-Cell Point-To-Multipoint (SC-PTM).

In NR system, large-scale Massive Multiple Input Multiple Output (MIMO) is an important technical feature. For the massive MIMO, large-scale antenna matrix forms a relatively narrow beam to point to a specific direction to improve the quality of communications. Since beams formed by the large-scale antenna matrix are generally narrow, beams from both sides of communications shall be aligned to enable effective communications. For this purpose, the NR system introduces a beam management mechanism, including beam measurement, feedback, update, indication, beam failure recovery and other functions.

SUMMARY

Inventors found through researches that compared with the traditional multicast groupcast services, differences of PTM/multicast groupcast services in the NR system include that beam gain of large-scale antenna matrix can be used to improve the performance of PTM/multicast groupcast services. How to enhance the existing beam management mechanism to support the PTM/multicast groucast services is a problem to be solved.

To address the above problem, the present disclosure provides a solution. It should be noted that although the above description uses large-scale MIMO and beam-based communication scenarios as examples, the application is also applicable to other scenarios, such as LIE multi-antenna systems, where similar technical effects can be achieved. Additionally, the adoption of a unified solution for various scenarios (including but not limited to large-scale MIMO, beam-based communications and LIE multi-antenna systems) contributes to the reduction of hardware complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first reference signal group;
maintaining a first counter; and
transmitting a target signal;

herein, a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, a problem to be solved in the present disclosure includes: the support for PTM/multicast groupcast service is considered in the beam failure recovery mechanism.

In one embodiment, characteristics of the above method include: the first reference signal set is for unicast service, the second reference signal set is for PTM/multicast groupcast service, the first reference signal is a beam recommended for unicast service, and the second reference signal is a beam recommended for PTM/multicast groupcast service. A UE recommends a beam for unicast service in the beam failure recovery request, if the beam can be applied to PTM/multicast groupcast service, then another beam for PTM/multicast groupcast service is unnecessary to be transmitted, otherwise a transmission of the another beam for PTM/multicast groupcast service is necessary. Advantages of the above method include: the beam recommended by the UE in the beam failure recovery request can not only recover unicast service, but also PTM/multicast groupcast service, which reduces the impact of beam failure on the two types of services.

According to one aspect of the present disclosure, it is characterized in that the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold.

According to one aspect of the present disclosure, comprising:
  in response to the behavior of transmitting a target signal, monitoring a first-type signaling in a first resource set starting from a first time;
  herein, for the monitoring of the first-type signaling in the first resource set starting from the first time, the first node assumes same QCL parameter(s) as the first reference signal; time-domain resources occupied by the first signal are used to determine the first time.

In one embodiment, characteristics of the above method include: the first-type signaling is only used to recover a beam failure of unicast service.

In one embodiment, characteristics of the above method include: the first-type signaling is used to recover beam failures of unicast service and PTM/multicast groupcast service.

According to one aspect of the present disclosure, comprising:
  receiving a first target signaling, the first target signaling being used to determine a second time;
  in response to the behavior of receiving the first target signaling, stopping monitoring the first-type signaling in the first resource set after the second time.

According to one aspect of the present disclosure, comprising:
  in response to the behavior of transmitting a target signal, monitoring a second-type signaling in a second resource set starting from a third time;
  herein, for the monitoring of the second-type signaling in the second resource set starting from the third time, the first node assumes QCL parameter(s) same as the second reference signal.

In one embodiment, characteristics of the above method include: the first-type signaling is for unicast service, and the second-type signaling is for PTM/multicast groupcast service. In the above method, after transmitting a beam failure recovery request, the UE monitors a beam failure recovery request response for unicast service and PTM/multicast groupcast service respectively. Advantages of the above method include: a beam for unicast service and a beam for PTM/multicast groupcast service can be quickly recovered after a beam failure, which reduces the influence of the beam failure on the two types of services.

According to one aspect of the present disclosure, comprising:
  receiving a second target signaling, the second target signaling being used to determine a fourth time;
  in a response to the behavior of receiving the second target signaling, stopping monitoring the second-type signaling in the second resource set after the fourth time.

According to one aspect of the present disclosure, it is characterized in that the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

In one embodiment, characteristics of the above method include: the first-type signal is for unicast service, and the second-type signal is for PTM/multicast groupcast service; a first reference signal set is configured for unicast service, and a second reference signal set is configured for PTM/multicast groupcast service.

The present disclosure provides a method in a second node for wireless communications, comprising:
  transmitting a first reference signal group; and
  receiving a target signal;
  herein, a measurement on the first reference signal group is used to determine a first-type received quality group, and the first-type received quality group is used by a transmitter of the target signal to maintain a first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

According to one aspect of the present disclosure, it is characterized in that the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold.

According to one aspect of the present disclosure, comprising:
  transmitting a first-type signaling in a first resource set starting from a first time;
  herein, the transmitter of the target signal monitors the first-type signaling in the first resource set starting from the first time; for the monitoring of the first-type signaling in the first resource set starting from the first time, the transmitter of the target signal assumes same QCL parameter(s) as the first reference signal; time-domain resources occupied by the first signal are used to determine the first time.

According to one aspect of the present disclosure, comprising:
  transmitting a first target signaling, the first target signaling being used to determine a second time; and
  stopping transmitting the first-type signaling in the first resource set after the second time.

According to one aspect of the present disclosure, comprising:
transmitting a second-type signaling in a second resource set starting from a third time;
herein, the transmitter of the target signal monitors the second-type signaling in the second resource set starting from the third time; for the monitoring of the second-type signaling in the second resource set starting from the third time, the transmitter of the target signal adopts same QCL parameter(s) as the second reference signal.

According to one aspect of the present disclosure, comprising:
transmitting a second target signaling, the second target signaling being used to determine a fourth time; and
stopping transmitting the second-type signaling in the second resource set after the fourth time.

According to one aspect of the present disclosure, it is characterized in that the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

The present disclosure provides a first node for wireless communication, comprising:
a first receiver, receiving a first reference signal group; maintaining a first counter; and
a first transmitter, transmitting a target signal;
herein, a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

The present disclosure provides a second node for wireless communications, comprising:
a second transmitter, transmitting a first reference signal group; and
a second receiver, receiving a target signal;
herein, a measurement on the first reference signal group is used to determine a first-type received quality group, and the first-type received quality group is used by a transmitter of the target signal to maintain a first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, the present disclosure has the following advantages over conventional schemes:
unicast service and PTM/multicast groupcast service are supported at the same time in the beam failure recovery mechanism;
a beam recommended by the UE in the beam failure recovery request can recover not only unicast service, but also PTM/multicast groupcast service, which reduces the impact of beam failure on the two types of services;
a beam for unicast service and a beam for PTM/multicast groupcast service can be quickly recovered after a beam failure, which reduces the influence of the beam failure on the two types of services.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
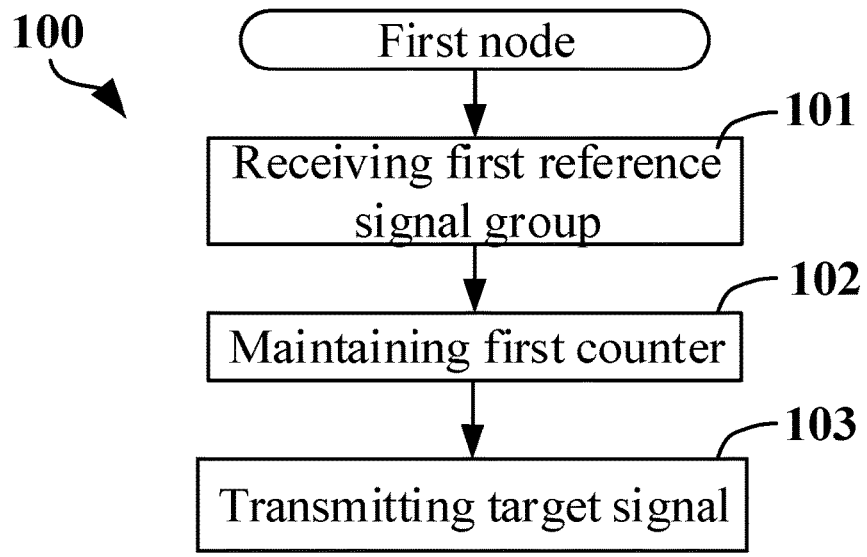
FIG. 1 illustrates a flowchart of a first reference signal group and a target signal according to one embodiment of the present disclosure.

Embodiment 1 illustrates a flowchart of a first reference signal and a target signal according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In Embodiment 1, the first node in the present disclosure receives a first reference signal group in step 101; maintains a first counter in step 102; and transmits a target signal in step 103; herein, a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, whether the first condition is satisfied is used to determine whether the target signal comprises the second signal.

In one embodiment, whether the first condition is satisfied is used to determine whether the second signal is transmitted.

In one embodiment, whether the second signal is transmitted is determined according to whether the first reference signal is associated with the second reference signal set.

In one embodiment, when a first condition is not satisfied, the second signal is transmitted; and when the first condition is satisfied, the second signal is dropped to be transmitted.

In one embodiment, the first signal belongs to a random access procedure.

In one embodiment, only the first signal in the first signal and the second signal belongs to a random access procedure.

In one embodiment, both the first signal and the second signal belong to a same random access procedure.

In one embodiment, the first signal and the second signal respectively comprise Msg1 and Msg3 in a same random access procedure.

In one embodiment, both the first signal and the second signal belong to Msg3 in a same random access procedure.

In one embodiment, one of the first signal and the second signal belongs to a Contention Free Random Access (CFRA) procedure, and the other one belongs to a Contention Based Random Access (CBRA) procedure.

In one embodiment, the first signal belongs to a CBRA procedure, and the second signal belongs to a CFRA procedure.

In one embodiment, the first signal and the second signal respectively belongs to two CBRA procedures.

In one embodiment, both the first signal and the second signal belong to different random access procedures.

In one embodiment, the first signal comprises a baseband signal.

In one embodiment, the first signal comprises a radio signal.

In one embodiment, the first signal comprises a radio-frequency signal.

In one embodiment, the first signal comprises a first characteristic sequence.

In one embodiment, the first characteristic sequence comprises one or more of a pseudo-random sequence, a Zadoff-Chu sequence, or a low Peak-to-Average Power Ratio (PAPR) sequence.

In one embodiment, the first characteristic sequence comprises a Cyclic Prefix (CP).

In one embodiment, the first signal comprises a Random Access Preamble.

In one embodiment, the first radio signal comprises a Random Access Channel (RACH) Preamble.

In one embodiment, the first signal comprises a content-free random access preamble.

In one embodiment, the first signal comprises a contention-based random access preamble.

In one embodiment, the first signal comprises a random access preamble used for a Beam Failure Recovery Request.

In one embodiment, the first signal comprises Uplink control information (UCI).

In one embodiment, the first signal comprises a Link Recovery Request (LRR).

In one embodiment, the first signal comprises a Medium Access Control layer Control Element (MAC CE).

In one embodiment, the first signal comprises a Beam Failure Recovery (BFR) MAC CE or a truncated BFR MAC CE.

In one embodiment, the first signal comprises a msgA.

In one embodiment, the first signal comprises a msg1.

In one embodiment, the first signal comprises a msg3.

In one embodiment, a channel occupied by the first signal comprises a Physical Random Access CHannel (PRACH).

In one embodiment, a channel occupied by the first signal comprises a Physical Uplink Shared CHannel (PUSCH).

In one embodiment, a channel occupied by the first signal comprises a Physical Uplink Control Channel (PUCCH).

In one embodiment, radio resources occupied by the first signal comprises PRACH resources.

In one embodiment, PRACH resources occupied by the first signal implicitly indicate a time-frequency resource position of a PUSCH occupied by the first signal.

In one embodiment, the second signal comprises a baseband signal.

In one embodiment, the second signal comprises a radio signal.

In one embodiment, the second signal comprises a radio-frequency signal.

In one embodiment, the second signal comprises a second characteristic sequence.

In one embodiment, the second characteristic sequence comprises one or more of a pseudo-random sequence, a Zadoff-Chu sequence, or a low PAPR sequence.

In one embodiment, the second characteristic sequence comprises a CP.

In one embodiment, the second signal comprises a Random Access Preamble.

In one embodiment, the second radio signal comprises a RACH Preamble.

In one embodiment, the second signal comprises a contention-free random access preamble.

In one embodiment, the second signal comprises a contention-based random access preamble.

In one embodiment, the second signal comprises a random access preamble used for a Beam Failure Recovery Request.

In one embodiment, the second signal comprises UCI.

In one embodiment, the second signal comprises an LRR.

In one embodiment, the second signal comprises a MAC CE.

In one embodiment, the second signal comprises a BFR MAC CE or a truncated BFR MAC CE.

In one embodiment, the second signal comprises a MsgA.

In one embodiment, the second signal comprises a Msg1.

In one embodiment, the second signal comprises a Msg3.

In one embodiment, a channel occupied by the second signal comprises a PRACH.

In one embodiment, a channel occupied by the second signal comprises a PUSCH.

In one embodiment, a channel occupied by the second signal comprises a PUCCH.

In one embodiment, radio resources occupied by the second signal comprise PRACH resources.

In one embodiment, PRACH resources occupied by the second signal implicitly indicate a time-frequency resource position of a PUSCH occupied by the second signal.

In one embodiment, when the first condition is satisfied, the first reference signal is associated with the second reference signal set; and when the first condition is not satisfied, the first reference signal is not associated with the second reference signal set.

In one embodiment, when the first reference signal is associated with the second reference signal set, the first condition is satisfied; and when the first reference signal is not associated with the second reference signal set, the first condition is not satisfied.

In one embodiment, the meaning of "the first reference signal being associated with a second reference signal set" includes: the first reference signal belongs to a second reference signal set.

In one embodiment, the meaning of "the first reference signal being associated with a second reference signal set" includes: the first reference signal and a reference signal in a second reference signal set are Quasi Co-Located (QCL).

In one embodiment, the meaning of "the first reference signal being associated with a second reference signal set" includes: the first reference signal and a reference signal in a second reference signal set are QCL with a same reference signal.

In one embodiment, the meaning of "the first reference signal being not associated with a second reference signal set" includes: the first reference signal does not belong to a second reference signal set.

In one embodiment, the meaning of "the first reference signal being not associated with a second reference signal set" includes: the first reference signal and any reference signal in a second reference signal set are not QCL.

In one embodiment, the meaning of "the first reference signal being not associated with a second reference signal set" includes: the first reference signal and any reference signal in a second reference signal set are respectively QCL with different reference signals.

In one embodiment, the QCL comprises QCL Type-A.

In one embodiment, the QCL comprises QCL Type-B.

In one embodiment, the QCL comprises QCL Type-C.

In one embodiment, the QCL comprises QCL Type-D.

In one embodiment, the first reference signal is indicated by a higher layer of the first node to a lower layer of the first node.

In one embodiment, the first reference signal is provided by a higher layer of the first node.

In one embodiment, the first reference signal is a reference signal in the first reference signal set, and the second reference signal is a reference signal in the second reference signal set.

In one embodiment, the first reference signal set comprises a CSI-RS.

In one embodiment, the first reference signal set comprises CSI-RS resources.

In one embodiment, the first reference signal set comprises an SSB.

In one embodiment, the first reference signal set comprises a CSI-RS and/or an SSB.

In one embodiment, any reference signal in the first reference signal set is CSI-RS resources or an SSB.

In one embodiment, the second reference signal set comprises a CSI-RS.

In one embodiment, the second reference signal set comprises CSI-RS resources.

In one embodiment, the second reference signal set comprises an SSB.

In one embodiment, the second reference signal set comprises a CSI-RS and/or an SSB.

In one embodiment, any reference signal in the second reference signal set is CSI-RS resources or an SSB.

In one embodiment, a method in the first node comprises:
receiving a second information block;
herein, the second information block is used to indicate the first reference signal set and the second reference signal set.

In one embodiment, the second information block is carried by a higher-layer signaling.

In one embodiment, the second information block is carried by an RRC signaling.

In one embodiment, the second information block comprises at least one IE in an RRC signaling.

In one embodiment, the second information block comprises a plurality of IEs in an RRC signaling.

In one embodiment, the second information block comprises an IE in an RRC signaling.

In one embodiment, the second information block comprises partial fields of an IE in an RRC signaling.

In one embodiment, the second information block comprises all or partial information in a candidateBeamRSList field in a BeamFailureRecoveryConfig IE.

In one embodiment, an information sub block in the second information block comprises all or partial information in a candidateBeamRSList field in a BeamFailureRecoveryConfig IE.

In one embodiment, a name of IE to which the second information block belongs comprises a BeamFailureRecovery.

In one embodiment, a name of IE to which the second information block belongs comprises a BeamFailure.

In one embodiment, a name of IE to which the second information block belongs comprises a BF.

In one embodiment, the second information block comprises T information sub-blocks, T being a positive integer greater than 1.

In one embodiment, any information sub-block in the second information block belongs to an IE in an RRC signaling.

In one embodiment, there exist two information sub-blocks in the second information block belonging to two IEs in an RRC signaling.

In one embodiment, any two information sub-blocks in the second information block belongs to a same IE in an RRC signaling.

In one embodiment, the second information block explicitly indicates the first reference signal set and the second reference signal set.

In one embodiment, the second information block implicitly indicates the first reference signal set and the second reference signal set.

In one embodiment, the second information block indicates an index of each reference signal in the first reference signal set and the second reference signal set.

In one embodiment, the second information block comprises configuration information of each reference signal in the first reference signal set and the second reference signal set.

In one embodiment, configuration information of any reference signal in the first reference signal set and the second reference signal set comprises at least one of period, time-domain offset, occupied time-domain resources, occupied frequency-domain resources, occupied code-domain resources, cyclic shift, Orthogonal Cover Code (OCC), occupied antenna port group, sequence, TCI state, spatial-domain filter, spatial reception parameters or spatial transmission parameters.

Embodiment 2

Figure 2:
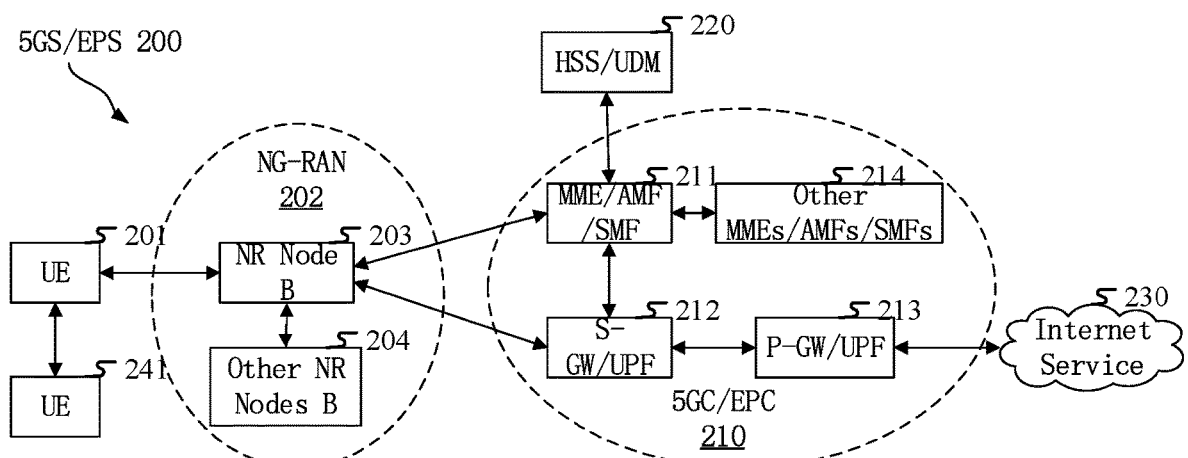
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LIE), Long-Term Evolution Advanced (LIE-A) and future 5G systems. The LIE, LIE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present disclosure comprises the UE 201.

In one embodiment, the first node in the present disclosure comprises the UE 241.

In one embodiment, the second node in the present disclosure comprises the gNB 203.

Embodiment 3

Figure 3:
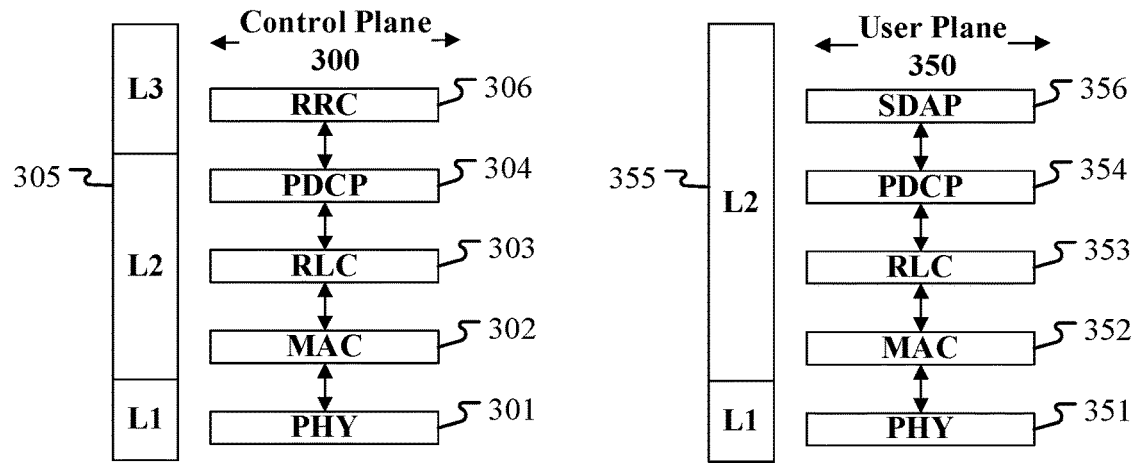
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first reference signal group is generated by the PHY 301 or the PHY 351.

In one embodiment, the first counter is maintained in the MAC sublayer 302 or the MAC sublayer 352.

In one embodiment, the target signal is generated by the PHY 301 or the PHY 351.

In one embodiment, the target signal is generated by the MAC sublayer 302 or the MAC sublayer 352.

In one embodiment, the target signal is generated by the PHY 301 and the MAC sublayer 302.

In one embodiment, the target signal is generated by the PHY 351 and the MAC sublayer 352.

In one embodiment, the monitoring performed on the first-type signaling is executed in the PHY 301, or the PHY 351.

In one embodiment, the monitoring performed on the second-type signaling is executed in the PHY 301, or the PHY 351.

In one embodiment, the first target signaling is generated by the PHY 301 or the PHY 351.

In one embodiment, the first target signaling is generated by the MAC sublayer 302 or the MAC sublayer 352.

In one embodiment, the first target signaling is generated by the PHY 301 and the MAC sublayer 302.

In one embodiment, the first target signaling is generated by the PHY 351 and the MAC sublayer 352.

In one embodiment, the second target signaling is generated by the PHY 301 or the PHY 351.

In one embodiment, the second target signaling is generated by the MAC sublayer 302 or the MAC sublayer 352.

In one embodiment, the second target signaling is generated by the PHY 301 and the MAC sublayer 302.

In one embodiment, the second target signaling is generated by the PHY 351 and the MAC sublayer 352.

Embodiment 4

Figure 4:
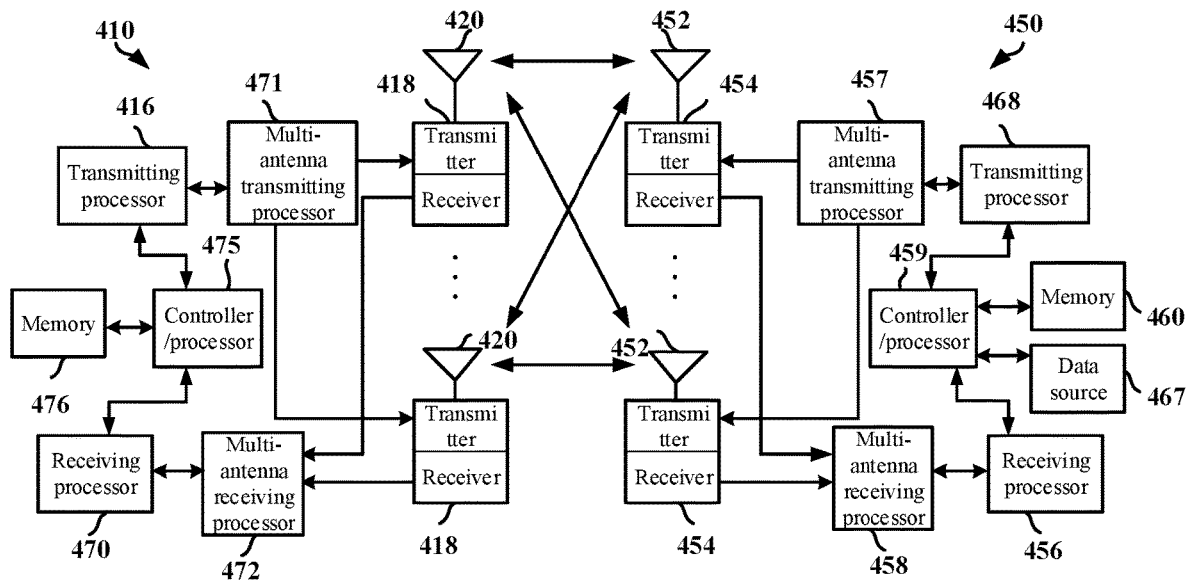
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first reference signal group; maintains a first counter; and transmits a target signal; herein, a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, the second communication device 450 comprises a memory that stores a computer readable instruction program. The computer readable instruction program generates an action when executed by at least one processor. The action includes: receiving a first reference signal group; maintaining a first counter; and transmitting a target signal; herein, a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first reference signal group; and receives a target signal; herein, a measurement on the first reference signal group is used to determine a first-type received quality group, and the first-type received quality group is used by a transmitter of the target signal to maintain a first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, the first communication device 410 comprises a memory that stores a computer readable instruction program. The computer readable instruction program generates an action when executed by at least one processor. The action includes: transmitting a first reference signal group; and receiving a target signal; herein, a measurement on the first reference signal group is used to determine a first-type received quality group, and the first-type received quality group is used by a transmitter of the target signal to maintain a first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first reference signal group in the present disclosure; at least one of the antenna 420, the transmitter 418, the transmitting processor 416, the multi-antenna transmitting processor 471, the controller/processor 475, or the memory 476 is used to transmit the first reference signal group of the present disclosure.

In one embodiment, at least one of the antenna 452, the receiver 454, the receiving processor 456, the multi-antenna receiving processor 458, the controller/processor 459, the memory 460, or the data source 467 is used to maintain the first counter in the present disclosure.

In one embodiment, at least one of the antenna 452, the receiver 454, the receiving processor 456, the multi-antenna receiving processor 458, the controller/processor 459, the memory 460, or the data source 467 is used to monitor the first-type signaling in the first resource set starting from the first time in the present disclosure; at least one of the antenna 420, the receiver 418, the receiving processor 416, the multi-antenna transmitting processor 471, the controller/processor 475, or the memory 476 is used to transmit the first-type signaling in the first resource set starting from the first time in the present disclosure.

In one embodiment, at least one of the antenna 452, the receiver 454, the receiving processor 456, the multi-antenna receiving processor 458, the controller/processor 459, the memory 460, or the data source 467 is used to receive the first target signaling in the present disclosure; at least one of the antenna 420, the transmitter 418, the transmitting processor 416, the multi-antenna transmitting processor 471, the controller/processor 475, or the memory 476 is used to transmit the first target signaling in the present disclosure.

In one embodiment, at least one of the antenna 452, the receiver 454, the receiving processor 456, the multi-antenna receiving processor 458, the controller/processor 459, the memory 460, or the data source 467 is used to monitor the second-type signaling in the second resource set starting from the third time in the present disclosure; at least one of the antenna 420, the receiver 418, the receiving processor 416, the multi-antenna transmitting processor 471, the controller/processor 475, or the memory 476 is used to transmit the second-type signaling in the second resource set starting from the third time in the present disclosure.

In one embodiment, at least one of the antenna 452, the receiver 454, the receiving processor 456, the multi-antenna receiving processor 458, the controller/processor 459, the memory 460, or the data source 467 is used to receive the second target signaling in the present disclosure; at least one of the antenna 420, the transmitter 418, the transmitting processor 416, the multi-antenna transmitting processor 471, the controller/processor 475, or the memory 476 is used to transmit the second target signaling in the present disclosure.

In one embodiment, at least one of the antenna 452, the transmitter 454, the transmitting processor 468, the multi-antenna transmitting processor 457, the controller/processor 459, or the memory 460 is used to transmit the target signal in the present disclosure; at least one of the antenna 420, the receiver 418, the receiving processor 470, the multi-antenna receiving processor 472, the controller/processor 475, or the memory 476 is used to receive the target signal in the present disclosure.

Embodiment 5

Figure 5:
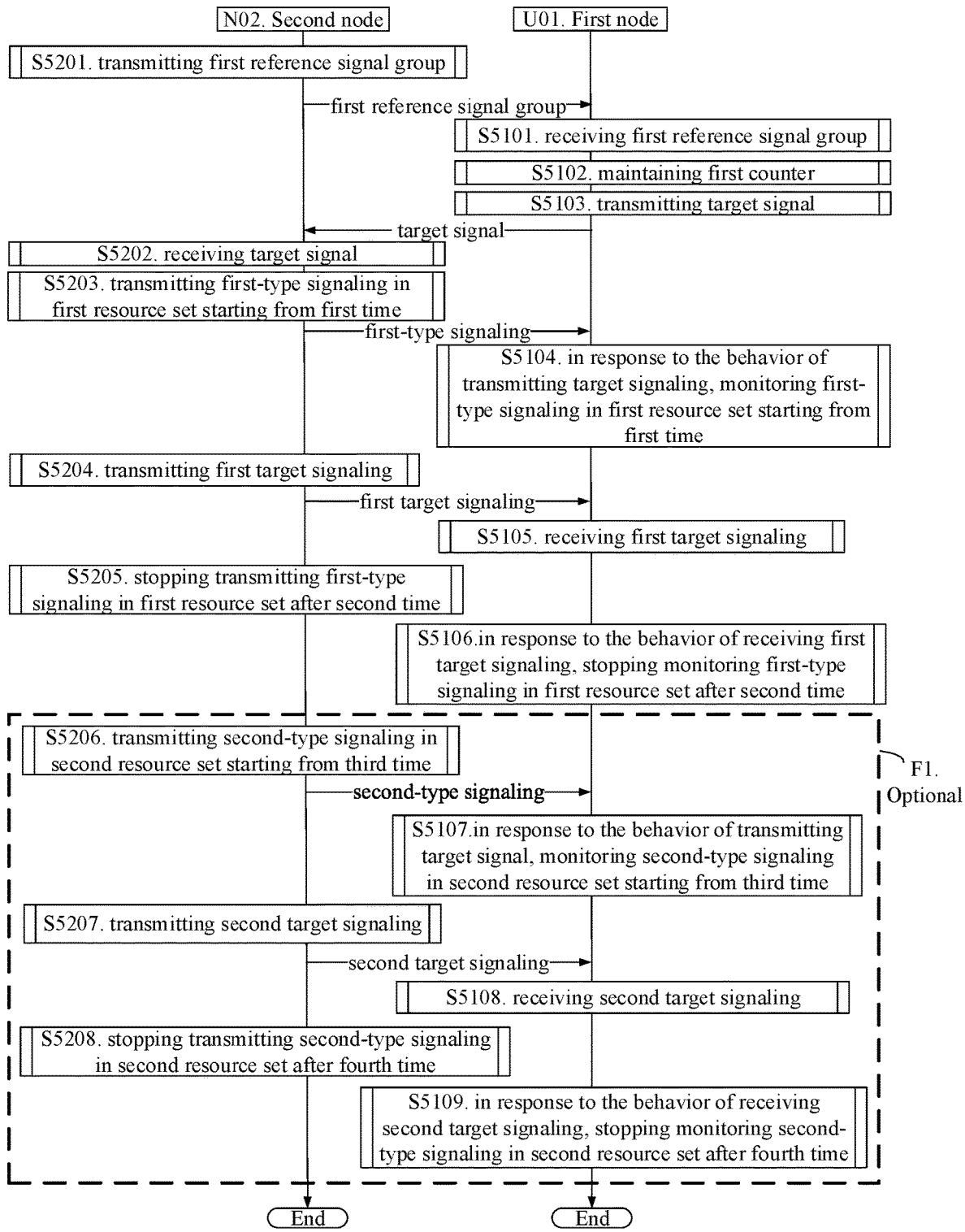
FIG. 5 illustrates a flowchart of wireless communications according to one embodiment of the present disclosure.

Embodiment 5 illustrates a flowchart of wireless transmission according to one embodiment in the present disclosure, as shown in FIG. 5. In FIG. 5, a first node U01 and a second node N02 are respectively communication nodes transmitted via an air interface. In FIG. 5, steps in box F1 are optional.

The first node U01 receives a first reference signal group in step S5101; maintains a first counter in step S5102; transmits a target signal in step S5103; in step S5104, in response to the behavior of transmitting a target signal, monitors a first-type signaling in a first resource set starting from a first time; receives a first target signaling in step S5105; in step S5106, in response to the behavior of receiving a first target signaling, stops monitoring a first-type signaling in a first resource set after a second time; in step S5107, in response to the behavior of transmitting a target signal, monitors a second-type signaling in a second resource set starting from a third time;

receives a second target signaling in step S5108; in step S5109, in response to the behavior of receiving a second target signaling, stops monitoring a second-type signaling in a second resource set after a fourth time; the second node N02 transmits a first reference signal group in step S5201; receives a target signal in step S5202; transmits a first-type signaling in a first resource set starting from a first time in step S5203; transmits a first target signaling in step S5204; stops transmitting a first-type signaling in a first resource set after a second time in step S5205; transmits a second-type signaling in a second resource set starting from a third time in step S5206; transmits a second target signaling in step S5207; and stops transmitting a second-type signaling in a second resource set after a fourth time in step S5208.

In embodiment 5, a measurement on the first reference signal group is used by the first node U01 to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set; for the monitoring of the first-type signaling in the first resource set starting from the first time, the first node assumes same QCL parameter(s) as the first reference signal; time-domain resources occupied by the first signal are used by the first node U01 to determine the first time; the first target signaling is used by the first node U01 to determine the second time; for the monitoring of the second-type signaling in the second resource set starting from the third time, the first node assumes same QCL parameter(s) as the second reference signal; the second target signaling is used by the first node U01 to determine the fourth time.

In one embodiment, the behavior of "in response to the behavior of transmitting a target signal, monitoring a second-type signaling in a second resource set starting from a third time" is executed not later than the behavior of "receiving a first target signal".

In one embodiment, the behavior of "transmitting a second-type signaling in a second resource set starting from a third time" is executed not later than the behavior of "transmitting a target signaling".

In one embodiment, the first signal is used by the first node U01 to determine a first reference signal, and the second signal is used by the first node U01 to determine a second reference signal.

In one embodiment, the first signal is used by the second node N02 to determine a first reference signal, and the second signal is used by the second node N02 to determine a second reference signal.

In one embodiment, the first resource set occupies at least one Resource Element (RE) in time-frequency domain.

In one embodiment, an RE occupies a symbol in time domain, and a subcarrier in frequency domain.

In one embodiment, the first resource set occupies at least one symbol in time domain.

In one embodiment, the first resource set occupies at least one Physical Resource block (PRB) in frequency domain.

In one embodiment, the first resource set comprises a search space set.

In one embodiment, the first resource set is a search space set.

In one embodiment, the first resource set comprises a plurality of Physical Downlink Control Channel (PDCCH) candidates.

In one embodiment, the first resource set comprises partial PDCCH candidates in a search space set.

In one embodiment, the first resource set comprises a COntrol REsource SET (CORESET).

In one embodiment, the first resource set is a CORESET.

In one embodiment, the first resource set occurs periodically in time domain.

In one embodiment, the first resource set occurs a plurality of times in time domain.

In one embodiment, the first resource set occurs only once in time domain.

In one embodiment, a search space set to which the first resource set belongs is identified by a recovery SearchSpaceId.

In one embodiment, the first resource set is a search space set, and the first resource set is identified by a recovery SearchSpaceId.

In one embodiment, a SearchSpaceId corresponding to a search space set to which the first resource set belongs is equal to a recoverySearchSpaceId.

In one embodiment, the first resource set is a search space set, and a SearchSpaceId corresponding to the first resource set is equal to a recoverySearchSpaceId.

In one embodiment, the first resource set is configured by a first higher-layer parameter.

In one embodiment, the first resource set is a search space set, and a first higher-layer parameter indicates a SearchSpaceId corresponding to the first resource set.

In one embodiment, the first higher-layer parameter comprises information comprised in a recoverySearchSpaceId field in a BeamFailureRecoveryConfig Information Element (IE).

In one embodiment, a name of the first higher-layer parameter comprises a recoverySearchSpaceId.

In one embodiment, the meaning of the phrase of "monitoring a given signal" includes: the monitoring refers to blind decoding, that is, a signal is received and decoding operation is performed; if a CRC bit determines that the decoding is correct, it is judged that the given signal is detected; otherwise, it is judged that the given signal is not detected.

In one embodiment, the meaning of the phrase of "monitoring a given signal" includes: the monitoring refers to a coherent detection, that is, coherent reception is performed and energy of a signal acquired after the coherent reception is measured; if the energy of the signal acquired after the coherent reception is greater than a first given threshold, it is judged that the given signal is detected; otherwise, it is judged that the given signal is not detected.

In one embodiment, the meaning of the phrase of "monitoring a given signal" includes: the monitoring refers to an energy detection, that is, energy of a radio signal is sensed and is averaged to acquire received energy; if the received energy is greater than a second given threshold, it is judged that the given signal is detected; otherwise, it is judged that the given signal is not detected.

In one embodiment, the meaning of the phrase of "monitoring a given signal" includes: determining whether the given signal is transmitted according to CRC.

In one embodiment, the meaning of the phrase of "monitoring a given signal" includes: not determining whether the given signal is transmitted before judging whether decoding is correct according to CRC.

In one embodiment, the meaning of the phrase "monitor a given signal" includes: determining whether the given signal is transmitted according to a coherent detection.

In one embodiment, the meaning of the phrase of "monitoring a given signal" includes: not determining whether the given signal is transmitted before a coherent detection.

In one embodiment, the meaning of the phrase of "monitoring a given signal" includes: determining whether the given signal is transmitted according to an energy detection.

In one embodiment, the meaning of the phrase of "monitoring a given signal" includes: not determining whether the given signal is transmitted before an energy detection.

In one embodiment, the given signal is the first-type signaling.

In one embodiment, the given signal is the second-type signaling.

In one embodiment, a transmission of the first signal is used to trigger the behavior of "monitoring a first-type signaling in a first resource set starting from a first time".

In one embodiment, in response to the first signal being transmitted, a first-type signaling is monitored in a first resource set starting from a first time.

In one embodiment, a transmission of the second signal is used to trigger the behavior of "monitoring a second-type signaling in a second resource set starting from a third time".

In one embodiment, in response to the second signal being transmitted, a second-type signaling is monitored in a second resource set starting from a third time.

In one embodiment, the behavior of "monitoring a second-type signaling in a second resource set starting from a third time" is related to whether the target signal comprises the second signal.

In one embodiment, when and only when the target signal comprises the second signal, and in response to the behavior of transmitting a target signal, a second-type signaling is monitored in a second resource set starting from a third time.

In one embodiment, when the target signal does not comprise the second signal, a second-type signaling is not monitored in a second resource set.

In one embodiment, the behavior of "monitoring a second-type signaling in a second resource set starting from a third time" is unrelated to whether the target signal comprises the second signal.

In one embodiment, when the target signal comprises the second signal, and in response to the behavior of transmitting a target signal, a second-type signaling is monitored in a second resource set starting from a third time.

In one embodiment, when the target signal does not comprise the second signal, and in response to the behavior of transmitting a target signal, a second-type signaling is monitored in a second resource set starting from a third time.

In one embodiment, the first-type signaling is a physical-layer signaling.

In one embodiment, the first-type signaling is a dynamic signaling.

In one embodiment, the first-type signaling is an L1 signaling.

In one embodiment, the first-type signaling comprises DCI.

In one embodiment, the first-type signaling comprises a DCI format.

In one embodiment, the first-type signaling comprises a UE specific DCI.

In one embodiment, the first-type signaling comprises a DCI format in which a CRC is scrambled by a Radio Network Temporary Identifier (RNTI) in a first identifier set, and the first identifier set comprises at least one RNTI.

In one embodiment, the first identifier set comprises a Cell-RNTI (C-RNTI).

In one embodiment, the first identifier set only comprises a C-RNTI.

In one embodiment, the first identifier set comprises a Modulation and Coding Scheme (MCS)-C-RNTI.

In one embodiment, the first identifier set consists of a C-RNTI and an MCS-C-RNTI.

In one embodiment, the first identifier set comprises a Configured Scheduling (CS)-RNTI.

In one embodiment, the first identifier set comprises a UE-specific RNTI.

In one embodiment, the first identifier set does not comprise a group common RNTI.

In one embodiment, any RNTI in the first identifier set is a UE-specific RNTI.

In one embodiment, a DCI format corresponding to any the first-type signaling belongs to a first format set, and the first format set comprises at least one DCI format.

In one embodiment, the first format set comprises at least one of DCI format 1_0, DCI format 1_1 or DCI format 1_2.

In one embodiment, the second-type signaling is a physical-layer signaling.

In one embodiment, the second-type signaling is a dynamic signaling.

In one embodiment, the second-type signaling is an L1 signaling.

In one embodiment, the second-type signaling comprises DCI.

In one embodiment, the second-type signaling comprises a DCI format.

In one embodiment, the second-type signaling comprises a UE-specific DCI.

In one embodiment, the second-type signaling comprises a DCI format in which a CRC is scrambled by an RNTI in a second identifier set, and the second identifier set comprises at least one RNTI.

In one embodiment, the second identifier set comprises a C-RNTI.

In one embodiment, the second identifier set does not comprise a C-RNTI.

In one embodiment, the second identifier set comprises a Group-RNTI (G-RNTI).

In one embodiment, the second identifier set comprises a Multicast-RNTI (M-RNTI).

In one embodiment, the second identifier set comprises a Group Common-RNTI (GC-RNTI).

In one embodiment, the second identifier set comprises a Single Carrier-Point to Multipoint-RNTI (SC-PTM-RNTI).

In one embodiment, the second identifier set comprises a UE-specific RNTI.

In one embodiment, any RNTI in the second identifier set is a UE-specific RNTI.

In one embodiment, the second identifier set does not comprise a UE-specific RNTI.

In one embodiment, the second identifier set comprises a group common RNTI.

In one embodiment, any RNTI in the second identifier set is a group common RNTI.

In one embodiment, the second identifier set does not comprise a group common RNTI.

In one embodiment, there exists an RNTI in the second identifier set not belonging to the first identifier set.

In one embodiment, there exists an RNTI in the first identifier set not belonging to the second identifier set.

In one embodiment, any RNTI in the second identifier set does not belong to the first identifier set.

In one embodiment, any RNTI in the first identifier set does not belong to the second identifier set.

In one embodiment, a DCI format corresponding to any the second-type signaling belongs to a second format set, and the second format set comprises at least one DCI format.

In one embodiment, the second format set comprises at least one of DCI format 1_0, DCI format 1_1 or DCI format 1_2.

In one embodiment, the second format set is the first format set.

In one embodiment, there exists a DCI format in the second format set not belonging to the first format set.

In one embodiment, there exists a DCI format in the first format set not belonging to the second format set.

In one embodiment, a CRC of the first-type signaling and a CRC of the second-type signaling are scrambled by different RNTIs.

In one embodiment, the first-type signaling and the second-type signaling correspond to different DCI formats.

In one embodiment, both the first-type signaling and the second-type signaling comprise a first field, and the first field comprises at least one binary bit; a value of the first field in any the first-type signaling is equal to a first value, and a value of the first field in any the second-type signaling is equal to a second value; the first value is not equal the second value.

In one embodiment, a first RNTI is used to generate a scrambling sequence of a Physical Downlink Shared CHannel (PDSCH) scheduled by a the first-type signaling, and a second RNTI is used to generate a scrambling sequence of a PDSCH scheduled by a the second-type signaling; and the first RNTI is not equal to the second RNTI.

In one embodiment, a time unit to which time-domain resources occupied by the first signal belong is used to determine the first time.

In one embodiment, the first time is later than time-domain resources occupied by the first signal.

In one embodiment, time-domain resources occupied by the first signal belong a time unit n, and the first time is a start time of a time unit (n+ a first interval); the first interval is a non-negative integer.

In one embodiment, the first interval is fixed.

In one embodiment, the first interval is fixed to 4.

In one embodiment, the first interval is configured by a higher-layer parameter.

In one embodiment, a said time unit is a slot.

In one embodiment, a said time unit is a sub-slot.

In one embodiment, a said time unit is a symbol.

In one embodiment, a said time unit comprises more than one consecutive symbols.

In one embodiment, a number of symbols comprised in a said time unit is configured by a higher-layer parameter.

In one embodiment, the meaning of the phrase of "monitoring a first-type signaling in a first resource set" includes: judging whether the first-type signaling is detected in the first resource set.

In one embodiment, the meaning of the phrase of "monitoring a second-type signaling in a second resource set" includes: judging whether the second-type signaling is detected in the second resource set.

In one embodiment, the meaning of the phrase of "for a given signal monitoring in a given resource set, the first node assumes same QCL parameter(s) as a given reference signal" includes: the first node assumes that a transmitting antenna port of the given signal transmitted in the given resource set and the given reference signal are QCL.

In one subembodiment of the above embodiment, the first node assumes that a transmitting antenna port of the given signal transmitted in the given resource set and the given reference signal correspond to QCL-TypeA and/or QCL-TypeD.

In one embodiment, the meaning of the phrase of "for a given signal monitoring in a given resource set, the first node assumes same QCL parameter(s) as a given reference signal" includes: the first node assumes that a DMRS transmitted in the given resource set and the given reference signal are QCL.

In one subembodiment of the above embodiment, the first node assumes that a DMRS transmitted in the given resource set and the given reference signal correspond to QCL-TypeA and/or QCL-TypeD.

In one embodiment, the meaning of the phrase of "for a given signal monitoring in a given resource set, the first node assumes same QCL parameter(s) as a given reference signal" includes: the given reference signal and a third reference signal are QCL, and the first node assumes that a transmitting antenna port of the given signal transmitted in the given resource set and the third reference signal are QCL.

In one embodiment, the meaning of the phrase of "for a given signal monitoring in a given resource set, the first node assumes same QCL parameter(s) as a given reference signal" includes: the given reference signal and a third reference signal are QCL, and the first node assumes that a DMRS transmitted in the given resource set and the third reference signal are QCL.

In one embodiment, the meaning of the phrase of "for a given signal monitoring in a given resource set, the first node assumes same QCL parameter(s) as a given reference signal" includes: the first node uses a same spatial domain filter to receive the given reference signal and monitor the given signal in the given resource set.

In one embodiment, the meaning of the phrase of "for a given signal monitoring in a given resource set, the first node assumes same QCL parameter(s) as a given reference signal" includes: the first node uses a same spatial domain filter to transmit the given reference signal and monitor the given signal in the given resource set.

In one embodiment, the meaning of the phrase of "for a given signal monitoring in a given resource set, the first node assumes same QCL parameter(s) as a given reference signal" includes: the given reference signal and a third reference signal are QCL, and the first node uses a same spatial domain filter to receive the third reference signal and monitor the given signal in the given resource set.

In one embodiment, the meaning of the phrase of "for a given signal monitoring in a given resource set, the first node assumes same QCL parameter(s) as a given reference signal" includes: large-scale properties of a channel that the given reference signal goes through can be used to infer large-scale properties of a channel that the given signal transmitted in the given resource set goes through.

In one embodiment, the meaning of the phrase of "for a given signal monitoring in a given resource set, the first node assumes same QCL parameter(s) as a given reference signal" includes: the given reference signal and a third reference signal are QCL, large-scale properties of a channel that the third reference signal goes through can be used to infer large-scale properties of a channel that the given signal transmitted in the given resource set goes through.

In one embodiment, the given resource set is the first resource set, a given signal is the first-type signaling, and the given reference signal is the first reference signal.

In one embodiment, the given resource set is the second resource set, a given signal is the second-type signaling, and the given reference signal is the second reference signal.

In one embodiment, the third reference signal comprises an SSB.

In one embodiment, the third reference signal comprises a CSI-RS.

In one embodiment, the meaning of the phrase of "stopping monitoring the first-type signaling in the first resource set after the second time" includes: stopping judging whether the first-type signaling is detected in the first resource set after the second time.

In one embodiment, the meaning of the phrase of "stopping monitoring the first-type signaling in the first resource set after the second time" includes: stopping monitoring a radio signal in the first resource set after the second time.

In one embodiment, the meaning of the phrase of "stopping monitoring the second-type signaling in the second resource set after the fourth time" includes: stopping judging whether the second-type signaling is detected in the second resource set after the fourth time.

In one embodiment, the meaning of the phrase of "stopping monitoring the second-type signaling in the second resource set after the fourth time" includes: stopping monitoring a radio signal in the second resource set after the fourth time.

In one embodiment, the first target signaling is a said first-type signaling.

In one embodiment, the first target signaling is a third-type signaling.

In one embodiment, the first target signaling comprises a third-type signaling or a fourth-type signaling.

In one embodiment, the first target signaling comprises a third-type signaling and a fourth-type signaling.

In one embodiment, the second target signaling is a said second-type signaling.

In one embodiment, the second target signaling is a fourth-type signaling.

In one embodiment, the third-type signaling comprises a higher-layer signaling.

In one embodiment, the third-type signaling is a higher-layer signaling.

In one embodiment, the third-type signaling comprises a MAC CE.

In one embodiment, the third-type signaling comprises an RRC signaling.

In one embodiment, the third-type signaling comprises a Transmission Configuration Indicator (TCI) state activated MAC CE.

In one embodiment, the third-type signaling comprises a TCI state activated/de-activated MAC CE.

In one embodiment, the third-type signaling comprises a UE-specific PDSCH TCI state activated/de-activated MAC CE.

In one embodiment, the third-type signaling comprises a TCI state indicated MAC CE.

In one embodiment, the third-type signaling comprises a UE-specific PDCCH TCI state indicated MAC CE.

In one embodiment, the third-type signaling comprises a higher-layer signaling used to deactivate a TCI state.

In one embodiment, the third-type signaling comprises a higher-layer signaling used to activate a TCI state or any parameter in a tci-StatesPDCCH-ToAddList and/or a tci-StatesPDCCH-ToReleaseList In one embodiment, the third-type signaling comprises a higher-layer signaling used to configure a tci-StatesPDCCH-ToAddList and/or a tci-StatesPDCCH-ToReleaseList.

In one embodiment, the third-type signaling comprises a MAC CE activation command for a TCI state or a tci-StatesPDCCH-ToAddList and/or a tci-StatesPDCCH-ToReleaseList.

In one embodiment, the third-type signaling is used to activate a TCI state.

In one embodiment, any the third-type signaling is used to activate a TCI state.

In one embodiment, the third-type signaling is used to configure a tci-StatesPDCCH-ToAddList and/or a tci-StatesPDCCH-ToReleaseList.

In one embodiment, any the third-type signaling is used to activate a TCI state or any parameter in a tci-StatesPDCCH-ToAddList and/or a tci-StatesPDCCH-ToReleaseList.

In one embodiment, the third-type signaling is transmitted in a PDSCH.

In one embodiment, the fourth-type signaling comprises a higher-layer signaling.

In one embodiment, the fourth-type signaling is a higher-layer signaling.

In one embodiment, the fourth-type signaling comprises a MAC CE.

In one embodiment, the fourth-type signaling comprises an RRC signaling.

In one embodiment, the fourth-type signaling is used to configure multicast service.

In one embodiment, the multicast service comprises Point-To-Multipoint (PTM) service.

In one embodiment, the multicast service comprises a multicast service.

In one embodiment, the multicast service comprises a broadcast service.

In one embodiment, the multicast service comprises a Multimedia Broadcast Multicast Service (MBMS).

In one embodiment, the fourth-type signaling comprises a higher-layer signaling used to deactivate a TCI state.

In one embodiment, the fourth-type signaling comprises a higher-layer signaling used to activate a TCI state or any parameter in a tci-StatesPDCCH-ToAddList and/or a tci-StatesPDCCH-ToReleaseList In one embodiment, the fourth-type signaling comprises a MAC CE activation command for a TCI state or a tci-StatesPDCCH-ToAddList and/or a tci-StatesPDCCH-ToReleaseList.

In one embodiment, the fourth-type signaling is transmitted in a PDSCH.

In one embodiment, the third-type signaling and the fourth-type signaling correspond to different radio bearers.

In one embodiment, a CRC of a scheduling signaling of the third-type signaling and a CRC of a scheduling signaling of the fourth-type signaling are scrambled by different RNTIs.

In one embodiment, a CRC of a scheduling signaling of the third-type signaling is scrambled by an RNTI in a third identifier set, and a CRC of a scheduling signaling of the fourth-type signaling is scrambled by an RNTI in a fourth identifier set; the third identifier set and the fourth identifier set respectively comprise at least one RNTI.

In one embodiment, there does exist an RNTI belonging to the third identifier set and the fourth identifier set at the same time.

In one embodiment, there exists an RNTI belonging to the third identifier set and the fourth identifier set at the same time.

In one embodiment, there exists an RNTI in the third identifier set not belonging to the fourth identifier set.

In one embodiment, there exists an RNTI in the fourth identifier set not belonging to the third identifier set.

In one embodiment, the third identifier set comprises a C-RNTI.

In one embodiment, the third identifier set comprises a UE specific RNTI.

In one embodiment, the third identifier set does not comprise a group common RNTI.

In one embodiment, the fourth identifier set does not comprise a C-RNTI.

In one embodiment, the fourth identifier set comprises a G-RNTI.

In one embodiment, the fourth identifier set comprises an M-RNTI.

In one embodiment, the fourth identifier set comprises a GC-RNTI.

In one embodiment, the fourth identifier set comprises an SC-PTM-RNTI.

In one embodiment, the fourth identifier set does not comprise a UE-specific RNTI.

In one embodiment, the fourth identifier set comprises a group common RNTI.

In one embodiment, the third-type signaling comprises a UE-dedicated higher-layer signaling; and the fourth-type signaling comprises a group common higher-layer signaling.

In one embodiment, the third-type signaling comprises information in all or partial fields in an IE.

In one embodiment, the fourth-type signaling comprises a System Information Block (SIB).

In one embodiment, the third-type signaling and the fourth-type signaling occupy different types of logical channels.

In one embodiment, a logical channel occupied by the third-type signaling comprises a Dedicated Control Channel (DCCH).

In one embodiment, a logical channel occupied by the third-type signaling comprises a Common Control Channel (CCCH).

In one embodiment, a logical channel occupied by the third-type signaling comprises a Dedicated Traffic Channel (DTCH).

In one embodiment, a logical channel occupied by the fourth-type signaling comprises a Multicast Control Channel (MCCH).

In one embodiment, a logical channel occupied by the fourth-type signaling comprises a Multicast Traffic Channel (MTCH).

In one embodiment, the third-type signaling and the fourth-type signaling occupy different types of transport channels.

In one embodiment, a transport channel occupied by the third-type signaling comprises a Downlink Shared Channel (DL-SCH).

In one embodiment, a transport channel occupied by the fourth-type signaling comprises a Multicast Channel (MCH).

In one embodiment, a transport channel occupied by the fourth-type signaling comprises a Single Carrier (SC)-MCH.

In one embodiment, both the third-type signaling and the fourth-type signaling comprise a second field, the second field comprised in the third-type signaling indicates a CORESET belonging to a first CORESET set, and the second field comprised in the fourth-type signaling indicates a CORESET belonging to a second CORESET set; the first CORESET set and the second CORESET set respectively comprise at least one CORESET.

In one embodiment, the second field comprises at least one binary bit.

In one embodiment, the second field indicates a CORESET ID.

In one embodiment, a value of the second field is equal to an indicated CORESET ID.

In one embodiment, the second field comprises 4 bits.

In one embodiment, there exists a CORESET in the first CORESET set not belonging to the second CORESET set.

In one embodiment, there exists a CORESET in the second CORESET set not belonging to the first CORESET set.

In one embodiment, the first node does not detect a fifth-type DCI in any search space set associated with any CORESET in the first CORESET set; for any given CORESET in the second CORESET set, the first node detects the fifth DCI in at least one search space set associated with the given CORESET.

In one embodiment, the fifth-type DCI is a group common DCI.

In one embodiment, the fifth-type DCI comprises a group common DCI.

In one embodiment, the fifth-type DCI is transmitted on a group common PDCCH.

In one embodiment, the fifth-type DCI comprises a UE-specific DCI.

In one embodiment, the fifth-type DCI is scrambled by an RNTI in a fifth identifier set, and the fifth identifier set comprises at least one RNTI.

In one subembodiment of the above embodiment, the fifth identifier set comprises a group common RNTI.

In one subembodiment of the above embodiment, the fifth identifier set comprises a UE-specific RNTI.

In one subembodiment of the above embodiment, the fifth identifier set comprises a G-RNTI.

In one subembodiment of the above embodiment, the fifth identifier set comprises an M-RNTI.

In one subembodiment of the above embodiment, the fifth identifier set comprises an SC-PTM-RNTI.

In one embodiment, a DCI format of the fifth-type DCI belongs to a third format set, and the third format set comprises at least one DCI format.

In one embodiment, the fifth-type DCI comprises a third field, and the third field comprises at least one binary bit; a value of the third field in any the fifth-type DCI is equal to a third value, and the third value is a non-negative integer.

In one embodiment, the first target signaling is carried by a first PDSCH; if the first target signaling is a said third-type signaling, a said first type signaling is used to indicate scheduling information of the first PDSCH.

In one embodiment, the second target signaling is carried by a second PDSCH; if the second target signaling is a said fourth-type signaling, a said second type signaling is used to indicate scheduling information of the second PDSCH.

In one embodiment, the scheduling information comprises one or more of time-domain resources, frequency-domain resources, a Modulation and Coding Scheme (MCS), a DeModulation Reference Signals (DMRS) port, a Hybrid Automatic Repeat reQuest (HARQ) process number, a Redundancy Version (RV), or a New Data Indicator (NDI).

In one embodiment, time-domain resources occupied by the first target signaling are used to determine the second time.

In one embodiment, the second time is a start time of time-domain resources occupied by the first target signaling.

In one embodiment, the second time is an end time of time-domain resources occupied by the first target signaling.

In one embodiment, time-domain resources occupied by the first target signaling belongs to a first time unit, and the first time unit is used to determine the second time.

In one embodiment, the second time is a start time of the first time unit.

In one embodiment, the second time is an end time of the first time unit.

In one embodiment, the second time is later than a first reference time, a time interval between the second time and the first reference time is a second interval, and the second interval is a non-negative integer.

In one embodiment, the second interval is measured by slot.

In one embodiment, the second interval is measured by symbol.

In one embodiment, the second interval is measured by the time unit.

In one embodiment, the second interval is fixed.

In one embodiment, the second interval is configured by a higher-layer parameter.

In one embodiment, the first reference time is a start time of time-domain resources occupied by the first target signaling.

In one embodiment, the first reference time is an end time of time-domain resources occupied by the first target signaling.

In one embodiment, the first reference time is a start time of the first time unit.

In one embodiment, the first reference time is an end time of the first time unit.

In one embodiment, the first target signaling indicates the second time.

In one embodiment, the first target signaling indicates the second interval.

In one embodiment, the second time is not earlier than an end time of time-domain resources occupied by the first target signaling.

In one embodiment, the second time is not earlier than an end time of the first time unit.

In one embodiment, the third time and the first time are the same.

In one embodiment, the third time and the first time are different.

In one embodiment, time-domain resources occupied by the second signal are used to determine the third time.

In one embodiment, a time unit to which time-domain resources occupied by the second signal belong is used to determine the third time.

In one embodiment, the third time is later than time-domain resources occupied by the second signal.

In one embodiment, time-domain resources occupied by the second signal belong to a time unit n2, and the third time is a start time of a time unit (n2+a third time interval); the third interval is a non-negative integer.

In one embodiment, the third interval is fixed.

In one embodiment, the third interval is fixed to 4.

In one embodiment, the third interval is configured by a higher-layer parameter.

In one embodiment, a transmission of the second signal is used to trigger monitoring a second-type signaling in a second resource set starting from a third time.

In one embodiment, in response to the second signal being transmitted, a second-type signaling is monitored in a second resource set starting from a third time.

In one embodiment, the second resource set occupies at least one RE in time-frequency domain.

In one embodiment, the second resource set occupies at least one symbol in time domain.

In one embodiment, the second resource set occupies at least one PRB in frequency domain.

In one embodiment, the second resource set comprises a search space set.

In one embodiment, the second resource set is a search space set.

In one embodiment, the second resource set comprises a plurality of PDCCH candidates.

In one embodiment, the second resource set comprises partial PDCCH candidates in a search space set.

In one embodiment, the second resource set comprises a CORESET.

In one embodiment, the second resource set is a CORESET.

In one embodiment, the second resource set occurs periodically in time domain.

In one embodiment, the second resource set occurs a plurality of times in time domain.

In one embodiment, the second resource set occurs only once in time domain.

In one embodiment, the second resource set is the first resource set.

In one embodiment, the second resource set is the same as the first resource set.

In one embodiment, the first resource set comprises the second resource set.

In one embodiment, the second resource set comprises the first resource set.

In one embodiment, the first resource set and the second resource set belong to a same search space set.

In one embodiment, the first resource set and the second resource set respectively comprise PDCCH candidates of a same search space set in different monitoring occasions.

In one embodiment, the first resource set and the second resource set are orthogonal in time domain.

In one embodiment, the first resource set and the second resource set are overlapped in time domain.

In one embodiment, a start time of the second resource set is later than a first the first-type signaling detected in the first resource set.

In one embodiment, a start time of the second resource set is after 28 symbols after an end symbol of a first the first-type signaling detected in the first resource set.

In one embodiment, the second resource set is associated with a CORESET indexed as 0.

In one embodiment, the behavior of "monitoring a first-type signaling in a first resource set starting from a first time" is earlier than the behavior of "monitoring a second-type signaling in a second resource set starting from a third time".

In one embodiment, after firstly detecting the first-type signaling in the first resource set, the first node starts monitoring the second-type signaling in the second resource set.

In one embodiment, in response to a behavior of "detecting a first the first-type signaling in the first resource set", the first node monitors the second-type signaling in the second resource set.

In one embodiment, the first resource set and the second resource set respectively belong to two different search space sets.

In one embodiment, the first resource set and the second resource set respectively correspond to different SearchSpaceIds.

In one embodiment, a search space set to which the first resource set belongs and a search space set to which the second resource set belongs respectively correspond to different SearchSpaceIds.

In one embodiment, the first resource set and the second resource set are associated with a same CORESET.

In one embodiment, the first resource set and the second resource set are respectively associated with different CORESETs.

In one embodiment, a CORESET associated with the first resource set and a CORESET associated with the second resource set correspond to different ControlResourceSetIds.

In one embodiment, the first resource set and the second resource set belong to a same carrier.

In one embodiment, the first resource set and the second resource set belong to a same BandWidth Part (BWP).

In one embodiment, the first resource set and the second resource set belong to a same cell.

Embodiment 6

Figure 6:
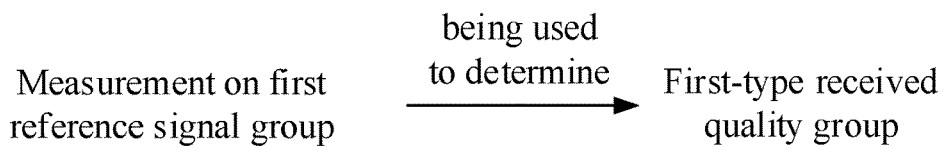
FIG. 6 illustrates a schematic diagram of a measurement performed on a first reference signal group being used to determine a first-type received quality group according to one embodiment of the present disclosure.

Embodiment 6 illustrates a schematic diagram of a measurement performed on a first reference signal group being used to determine a first-type received quality group according to one embodiment of the present disclosure, as shown in FIG. 6.

In one embodiment, the first reference signal group comprises at least one reference signal.

In one embodiment, the first reference signal group comprises a Channel State Information-Reference Signal (CSI-RS).

In one embodiment, the first reference signal group comprises a periodic CSI-RS.

In one embodiment, the first reference signal group comprises at least one of a CSI-RS or a Synchronization Signal/Physical Broadcast CHannel (SS/PBCH) Block.

In one embodiment, any reference signal in the first reference signal group is a CSI-RS.

In one embodiment, any reference signal in the first reference signal group is a CSI-RS or an SSB.

In one embodiment, any reference signal in the first reference signal group is a periodic reference signal.

In one embodiment, any reference signal in the first reference signal group is a periodic reference signal or a semi-persistent reference signal.

In one embodiment, all reference signals in the first reference signal group belong to a same carrier.

In one embodiment, all reference signals in the first reference signal group belong to a same BWP.

In one embodiment, all reference signals in the first reference signal group belong to a same cell.

In one embodiment, there exist two reference signals in the first reference signal group respectively belonging to different carriers.

In one embodiment, there exist two reference signals in the first reference signal group respectively belonging to different cells.

In one embodiment, there exist two reference signals in the first reference signal group respectively belonging to different BWPs.

In one embodiment, the first reference signal group is $\bar{q}_0$.

In one embodiment, the specific meaning of the $\bar{q}_0$ can be found in 3GPP TS38.213, section 6.

In one embodiment, the first reference signal group is configured by failureDetectionResources.

In one embodiment, the specific definition of the failure Detection Resources can be found in 3GPP TS38.213, section 6.

In one embodiment, a maximum number of reference signals comprised in the first reference signal group is configured by maxNrofFailureDetectionResources.

In one embodiment, the specific meaning of themaxNrofFailureDetectionResources can be found in 3GPP TS38.331, section 6.3.2.

In one embodiment, the first reference signal group comprises a reference signal indicated by a TCI state of corresponding CORESETs utilized when monitoring a PDCCH.

In one embodiment, the first reference signal group consists of a periodic CSI-RS indicated by a TCI state of corresponding CORESETs utilized when monitoring a PDCCH.

In one embodiment, the first reference signal group comprises at least one reference signal, and the first-type received quality group comprises at least one first-type received quality.

In one embodiment, a number of reference signals comprised in the first reference signal group is equal to a number of first-type receiving qualities comprised in the first-type received quality group.

In one embodiment, the first reference signal group only comprises one reference signal, the first type received quality group only comprises one first-type received quality, and a measurement performed on the one reference signal determines the one first-type received quality.

In one embodiment, the first reference signal group comprises S reference signals, the first-type received quality group comprises S first-type received quality, S being a positive integer greater than 1; measurements performed on the S reference signals respectively determine the S first-type receiving qualities.

In one embodiment, for any given reference signal in the first reference signal group, a measurement performed on the given reference signal in a first time interval is used to determine a first-type received quality corresponding to the given reference signal.

In one embodiment, for any given reference signal in the first reference signal group, the first node obtains a measurement used to calculate a first-type received quality corresponding to the given reference signal only according to the given reference signal received within a first time interval.

In one embodiment, the measurement comprises a channel measurement.

In one embodiment, the measurement comprises an interference measurement.

In one embodiment, the first time interval is a continuous duration.

In one embodiment, a length of the first time interval is $T_{Evaluate\_BFD\_SSB}$ ms or $T_{Evaluate\_BFD\_CSI-RS}$ ms.

In one embodiment, the definition of $T_{Evaluate\_BFD\_SSB}$ and $T_{Evaluate\_BFD\_CSI-RS}$ can be found in 3GPP TS38.133.

In one embodiment, any first-type received quality in the first-type received quality group comprises Reference Signal Received Power (RSRP).

In one embodiment, any first-type received quality in the first-type received quality group comprises L1-RSRP.

In one embodiment, any first-type received quality in the first-type received quality group is L1-RSRP.

In one embodiment, any first-type received quality in the first-type received quality group comprises a Signal-to-noise and interference ratio (SINR).

In one embodiment, any first-type received quality in the first-type received quality group comprises an L1-SINR.

In one embodiment, any first-type received quality in the first-type received quality group is an L1-SINR.

In one embodiment, any first-type received quality in the first-type received quality group comprises a BLock Error Rate (BLER).

In one embodiment, any first-type received quality in the first-type received quality group is a BLER.

In one embodiment, a given reference signal is a reference signal of the first reference signal group.

In one subembodiment of the above embodiment, RSRP or L1-RSRP of the given reference signal is used to determine a first-type received quality corresponding to the given reference signal.

In one subembodiment of the above embodiment, a first-type received quality corresponding to the given reference signal is equal to RSRP or L1-RSRP of the given reference signal.

In one subembodiment of the above embodiment, an SINR or an L1-SINR of the given reference signal is used to determine a first-type received quality corresponding to the given reference signal.

In one subembodiment of the above embodiment, a first-type received quality corresponding to the given reference signal is equal to an SINR or an L1-SINR of the given reference signal.

In one subembodiment of the above embodiment, the given reference signal is any reference signal in the first reference signal group.

In one embodiment, any first-type received quality in the first-type received quality group is obtained by table looking-up RSRP, L1-RSRP, an SINR or an L1-SINR of a corresponding reference signal.

In one embodiment, any first-type received quality in the first-type received quality group is obtained according to hypothetical PDCCH transmission parameters.

In one embodiment, the specific meaning of the hypothetical PDCCH transmission parameters can be found in 3GPP TS38.133.

In one embodiment, a method in the first node comprises:
receiving a first information block;
herein, the first information block is used to indicate the first reference signal group.

In one embodiment, the first information block is carried by a higher-layer signaling.

In one embodiment, the first information block is carried by an RRC signaling.

In one embodiment, the first information block comprises at least one IE in an RRC signaling.

In one embodiment, the first information block comprises a plurality of IEs in an RRC signaling.

In one embodiment, the first information block comprises an IE in an RRC signaling.

In one embodiment, the first information block comprises partial fields of an IE in an RRC signaling.

In one embodiment, the first information block is carried by a MAC CE signaling.

In one embodiment, the first information comprises S information sub-blocks, S being a positive integer greater than 1; and any information sub-block in the first information block belongs to an IE in an RRC signaling.

In one embodiment, the first information comprises S information sub-blocks, S being a positive integer greater than 1; there exist two information sub-blocks in the first information block belonging to two IEs in an RRC signaling.

In one embodiment, the first information comprises S information sub-blocks, S being a positive integer greater than 1; and any two information sub-blocks in the first information block belongs to a same IE in an RRC signaling.

In one embodiment, the first information block indicates a TCI state of corresponding CORESETs utilized when monitoring a PDCCH, and the first reference signal group comprises a reference signal indicated by a TCI state of corresponding CORESETs utilized when monitoring a PDCCH.

In one embodiment, the first information block indicates a TCI state of corresponding CORESETs utilized when monitoring a PDCCH, and the first reference signal group consists of a periodic CSI-RS indicated by a TCI state of corresponding CORESETs utilized when monitoring a PDCCH.

In one embodiment, the first information block comprises a failureDetectionResourcesToAddModList field and a failureDetectionResourcesToReleaseList field in a RadioLinkMonitoringConfig IE, and definitions of the RadioLinkMonitoringConfig IE, the failureDetectionResourcesToAddModList field and the failureDetectionResourcesToReleaseList field can be found in 3GPP TS38.331, section 6.3.2.

In one embodiment, the first information block comprises failure Detection Resources, the specific definition of the failure Detection Resources can be found in 3GPP TS38.213, section 6.

In one embodiment, the first information comprises a beamFailureDetectionResourceList, and the specific meaning of the beamFailureDetectionResourceList can be found in 3GPP TS38.213, section 6.

In one embodiment, the first information block comprises at least one ControlResourceSet IE, and the specific meaning of the ControlResourceSet IE can be found in 3GPP TS38.331, section 6.3.2.

In one embodiment, the first information block explicitly indicates the first reference signal group.

In one embodiment, the first information block implicitly indicates the first reference signal group.

In one embodiment, the first information block indicates an index of each reference signal in the first reference signal group.

In one embodiment, the first information block comprises configuration information of each reference signal in the first reference signal group.

In one embodiment, configuration information of any reference signal in the first reference signal group comprises at least one of period, time-domain offset, occupied time-domain resources, occupied frequency-domain resources, occupied code-domain resources, cyclic shift, Orthogonal Cover Code, occupied antenna port group, sequence, TCI state, spatial domain filter, spatial reception parameters, or spatial transmission parameters.

In one embodiment, the first information block comprises S information sub-blocks, the first reference signal group comprises S reference signals, the S information sub-blocks are respectively used to indicate the S reference signals, S being a positive integer greater than 1.

Embodiment 7

Figure 7:
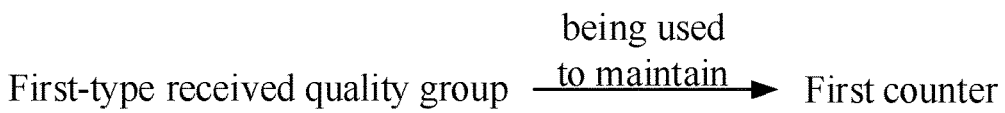
FIG. 7 illustrates a schematic diagram of a first-type received quality group being used to maintain a first counter according to one embodiment of the present disclosure.

Embodiment 7 illustrates a schematic diagram of a first-type received quality group being used to maintain a first counter according to one embodiment of the present disclosure, as shown in FIG. 7.

In one embodiment, when a value of the first counter is not less than the first threshold, the target signal is triggered.

In one embodiment, the first threshold is a positive integer.

In one embodiment, the first threshold is configurable.

In one embodiment, the first threshold is fixed.

In one embodiment, the first threshold is configured by a higher layer parameter.

In one embodiment, a name of a higher-layer parameter configuring the first threshold includes beamFailureInstanceMaxCount.

In one embodiment, the first threshold is equal to a value of a higher-layer parameter beamFailureInstanceMaxCount.

In one embodiment, the first counter is BFI_COUNTER.

In one embodiment, an initial value of the first counter is 0.

In one embodiment, an initial value of the first counter is a positive integer.

In one embodiment, a value of the first counter is a non-negative integer.

In one embodiment, the first-type received quality group is used to determine whether a value of the first counter is increased by 1.

In one embodiment, when each first-type received quality in the first-type received quality group is worse than a third threshold, a value of the first counter is increased by 1.

In one embodiment, when each first-type received quality in the first-type received quality group is worse than or equal to a third threshold, a value of the first counter is increased by 1.

In one embodiment, when at least one first-type received quality in the first-type quality group is better than or equal to the third threshold, a value of the first counter remains unchanged.

In one embodiment, when at least one first-type received quality in the first-type quality group is better than the third threshold, a value of the first counter remains unchanged.

In one embodiment, when an average value of a first-type received quality in the first-type received quality group is worse than a third threshold, a value of the first counter is increased by 1.

In one embodiment, in response to receiving a beam failure instance indication from a lower layer, a value of the first counter is increased by 1; the first-type reception quality group is used by the lower layer to determine whether the beam failure instance indication is transmitted.

In one subembodiment of the above embodiment, when each first-type received quality in the first-type received quality group is worse than a third threshold, the lower layer transmits the beam failure instance indication.

In one subembodiment of the above embodiment, when each first-type received quality in the first-type received quality group is worse than or equal to a third threshold, the lower layer transmits the beam failure instance indication.

In one subembodiment of the above embodiment, when at least one first-type received quality in the first-type received quality group is better than or equal to a third threshold, the lower layer does not transmit the beam failure instance indication.

In one subembodiment of the above embodiment, when at least one first-type received quality in the first-type received quality group is better than a third threshold, the lower layer does not transmit the beam failure instance indication.

In one subembodiment of the above embodiment, when an average value of a first-type received quality in the first-type received quality group is worse than a third threshold, the lower layer transmits the beam failure instance indication.

In one subembodiment of the above embodiment, the lower layer comprises a physical layer.

In one embodiment, the third threshold is a real number.

In one embodiment, the third threshold is a non-negative real number.

In one embodiment, the third threshold is a non-negative real number not greater than 1.

In one embodiment, the third threshold is equal to one of $Q_{out\_L}$, $Q_{out\_LR\_SSB}$ or $Q_{out\_LR\_CSI-RS}$.

In one embodiment, the specific meanings of the $Q_{out\_L}$, $Q_{out\_LR\_SSB}$ and $Q_{out\_LR\_CSI-RS}$ can be found in 3GPP TS38.133.

In one embodiment, the third threshold is determined by a higher-layer parameter rlmInSyncOutOfSyncThreshold.

In one embodiment, if a first-type received quality is one of RSRP, L1-RSRP, an SINR or an L1-SINR and the first-type received quality is less than/greater than the third threshold; the first-type received quality is worse than/better than the third threshold.

In one embodiment, if a first-type received quality is a BLER and the first-type received quality is greater than/less than the third threshold; the first-type received quality is worse than/better than the third threshold.

In one embodiment, the first node maintains the first counter.

In one embodiment, the behavior of maintaining the first counter includes: determining whether a value of the first counter is increased by 1 according to the first-type received quality group.

In one embodiment, the behavior of maintaining the first counter includes: initializing a value of the first counter as 0.

In one embodiment, the behavior of maintaining the first counter includes: in response to receiving a beam failure instance indication from a lower layer, starting or restarting a first timer; when the first timer expires, clearing a value of the first counter.

In one embodiment, the first timer is a beamFailureDetectionTimer.

In one embodiment, an initial value of the first timer is a positive integer.

In one embodiment, an initial value of the first timer is a positive real number.

In one embodiment, an initial value of the first timer is configured by a higher-layer parameter beamFailureDetectionTimer.

In one embodiment, an initial value of the first timer is configured by an IE.

In one embodiment, a name of IE configuring an initial value of the first timer comprises RadioLinkMonitoring.

In one embodiment, the behavior of maintaining the first counter includes: if a random access procedure corresponding to the target signal succeeds, clearing a value of the first counter.

In one embodiment, the behavior of maintaining the first counter includes: if a random access procedure corresponding to the first signal succeeds, clearing a value of the first counter.

In one embodiment, the behavior of maintaining the first counter includes: if the first node receives a first PDCCH, clearing a value of the first counter; the first signal comprises a BFR MAC CE or a truncated BFR MAC CE, a HARQ process number corresponding to the first signal is a first HARQ process number; the first PDCCH indicates a UL grant of a new transmission corresponding to the first HARQ process number, and a CRC of the first PDCCH is scrambled by a C-RNTI.

Embodiment 8

Figure 8:
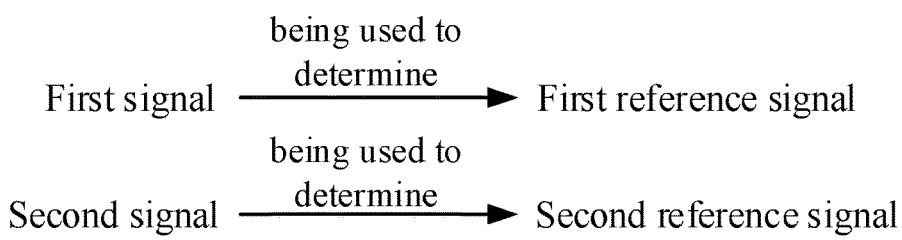
FIG. 8 illustrates a schematic diagram of a first signal being used to determine a first reference signal and a second signal being used to determine a second reference signal according to one embodiment of the present disclosure.

Embodiment 8 illustrates a schematic diagram of a first signal being used to determine a first reference signal and a second signal being used to determine a second reference signal according to one embodiment of the present disclosure, as shown in FIG. 8.

In one embodiment, the first reference signal comprises a downlink reference signal.

In one embodiment, the first reference signal comprises an uplink reference signal.

In one embodiment, the first reference signal comprises a Channel State Information-Reference Signal (CSI-RS).

In one embodiment, the first reference signal comprises CSI-RS resources.

In one embodiment, the first reference signal comprises a Non-Zero Power (NZP) CSI-RS.

In one embodiment, the first reference signal comprises a Synchronization Signal/physical broadcast channel Block (SSB) resource.

In one embodiment, the first reference signal comprises a Sounding Reference Signal (SRS).

In one embodiment, the first reference signal is CSI-RS resources or an SSB.

In one embodiment, the first reference signal is a periodic reference signal.

In one embodiment, the first reference signal is semi-persistent reference signal.

In one embodiment, the reference signal comprises reference signal resources.

In one embodiment, the reference signal comprises a reference signal port.

In one embodiment, a modulation symbol comprised in the reference signal is known to the first node.

In one embodiment, PRACH resources occupied by the first signal are used to determine the first reference signal.

In one embodiment, PRACH resources occupied by the first signal belong to a first PRACH resource set in K1 PRACH resource set(s), K1 being a positive integer; the K1 PRACH resource set(s) corresponds (respectively correspond) to K1 reference signals; the first reference signal is one of the K1 reference signal(s) corresponding to the first PRACH resource set; and any of the K1 PRACH resource set(s) comprises at least one PRACH resource.

In one embodiment, there exists one of the K1 PRACH resource set(s) only comprising one PRACH resource.

In one embodiment, there exists one of the K1 PRACH resource set(s) comprising a plurality of PRACH resources.

In one embodiment, the K1 PRACH resource set(s) is(are) configured by a higher layer parameter.

In one embodiment, a higher-layer parameter configuring the K1 PRACH resource set(s) comprises all or partial information in a candidateBeamRSList field and a candidateBeamRSListExt-v1610 field in a BeamFailureRecoveryConfig IE.

In one embodiment, a corresponding relation between the K1 PRACH resource set(s) and the K1 reference signal(s) is configured by a higher layer parameter.

In one embodiment, a higher-layer parameter configuring a corresponding relation between the K1 PRACH resource set(s) and the K1 reference signal(s) comprises all or partial information in a candidateBeamRSList field and a candidateBeamRSListExt-v1610 field in a BeamFailureRecoveryConfig IE.

In one embodiment, a PRACH resource comprises a PRACH occasion.

In one embodiment, a PRACH resource comprises a random access preamble.

In one embodiment, a PRACH resource comprises a random access preamble index.

In one embodiment, a PRACH resource comprises time-frequency resources.

In one embodiment, a random access preamble comprised in the first signal is one of K1 random access preamble(s), K1 being a positive integer; the K1 random access preamble(s) corresponds (respectively correspond) to K1 reference signal(s); the first reference signal is one of the K1 reference signal(s) corresponding to the random access preamble comprised in the first signal.

In one embodiment, the K1 random access preamble(s) is(are) configured by a higher-layer parameter.

In one embodiment, a higher-layer parameter configuring the K1 random access preamble(s) comprises all or partial information in a candidateBeamRSList field and a candidateBeamRSListExt-v1610 field in a BeamFailureRecoveryConfig IE.

In one embodiment, a corresponding relation between the K1 random access preamble(s) and the K1 reference signal(s) is configured by a higher layer parameter.

In one embodiment, a higher-layer parameter configuring a corresponding relation between the K1 random access preamble(s) and the K1 reference signal(s) comprises all or partial information in a candidateBeamRSList field and a candidateBeamRSListExt-v1610 field in a BeamFailureRecoveryConfig IE.

In one embodiment, K1 is equal to 1.

In one embodiment, K1 is greater than 1.

In one embodiment, K1 is not greater than 16.

In one embodiment, K1 is not greater than 64.

In one embodiment, the first reference signal group comprises the K1 reference signal(s), K1 being a positive integer.

In one embodiment, the K1 reference signal(s) comprises (comprise) a CSI-RS.

In one embodiment, the K1 reference signal(s) comprises (comprise) an SSB.

In one embodiment, the K1 reference signal(s) comprises (comprise) an SRS.

In one embodiment, the first signal carries a first bit string, and the first bit string comprises at least one binary bit; and a value of the first bit string indicates the first reference signal.

In one embodiment, the second reference signal comprises a downlink reference signal.

In one embodiment, the second reference signal comprises an upnlink reference signal.

In one embodiment, the second reference signal comprises a Channel State Information-Reference Signal (CSI-RS).

In one embodiment, the second reference signal comprises CSI-RS resources.

In one embodiment, the second reference signal comprises a Non-Zero Power (NZP) CSI-RS.

In one embodiment, the second reference signal comprises a Synchronization Signal/physical broadcast channel Block (SSB) resource.

In one embodiment, the second reference signal comprises a Sounding Reference Signal (SRS).

In one embodiment, the second reference signal is a CSI-RS resource or an SSB.

In one embodiment, the second reference signal is a periodic reference signal.

In one embodiment, the second reference signal is semi-persistent reference signal.

In one embodiment, PRACH resources occupied by the second signal are used to determine the second reference signal.

In one embodiment, PRACH resources occupied by the second signal belong to a second PRACH resource set in K2 PRACH resource set(s), K2 being a positive integer; the K2 PRACH resource set(s) corresponds (respectively correspond) to K2 reference signal(s); the second reference signal is one of the K2 reference signal(s) corresponding to the second PRACH resource set; and any of the K2 PRACH resource set(s) comprises at least one PRACH resource.

In one embodiment, there exists one of the K2 PRACH resource set(s) only comprising one PRACH resource.

In one embodiment, there exists one of the K2 PRACH resource set(s) comprising a plurality of PRACH resources.

In one embodiment, the K2 PRACH resource set(s) is(are) configured by a higher layer parameter.

In one embodiment, a higher-layer parameter configuring the K2 PRACH resource set(s) comprises all or partial information in a candidateBeamRSList field and a candidateBeamRSListExt-v1610 field in a BeamFailureRecoveryConfig IE.

In one embodiment, a corresponding relation between the K2 PRACH resource set(s) and the K2 reference signal(s) is configured by a higher layer parameter.

In one embodiment, a higher-layer parameter configuring a corresponding relation between the K2 PRACH resource set(s) and the K2 reference signal(s) comprises all or partial information in a candidateBeamRSList field and a candidateBeamRSListExt-v1610 field in a BeamFailureRecoveryConfig IE.

In one embodiment, a PRACH resource comprises a PRACH occasion.

In one embodiment, a PRACH resource comprises a random access preamble.

In one embodiment, a PRACH resource comprises a random access preamble index.

In one embodiment, a PRACH resource comprises time-frequency resources.

In one embodiment, a random access preamble comprised in the second signal is one of K2 random access preamble(s), K2 being a positive integer; the K2 random access preamble(s) corresponds (respectively correspond) to K2 reference signal(s); the second reference signal is one of the K2 reference signal(s) corresponding to the random access preamble comprised in the second signal.

In one embodiment, the K2 random access preamble(s) is(are) configured by a higher-layer parameter.

In one embodiment, a higher-layer parameter configuring the K2 random access preamble(s) comprises all or partial information in a candidateBeamRSList field and a candidateBeamRSListExt-v1610 field in a BeamFailureRecoveryConfig IE.

In one embodiment, a corresponding relation between the K2 random access preamble(s) and the K2 reference signal(s) is configured by a higher layer parameter.

In one embodiment, a higher-layer parameter configuring a corresponding relation between the K2 random access preamble(s) and the K2 reference signal(s) comprises all or partial information in a candidateBeamRSList field and a candidateBeamRSListExt-v1610 field in a BeamFailureRecoveryConfig IE.

In one embodiment, K2 is equal to 1.

In one embodiment, K2 is greater than 1.

In one embodiment, K2 is not greater than 16.

In one embodiment, K2 is not greater than 64.

In one embodiment, the second reference signal group comprises the K2 reference signal(s), K2 being a positive integer.

In one embodiment, the K2 reference signal(s) comprises (comprise) a CSI-RS.

In one embodiment, the K2 reference signal(s) comprises (comprise) an SSB.

In one embodiment, the K2 reference signal(s) comprises (comprise) an SRS.

In one embodiment, the second signal carries a second bit string, and the second bit string comprises at least one binary bit; and a value of the second bit string indicates the second reference signal.

Embodiment 9

Figure 9:
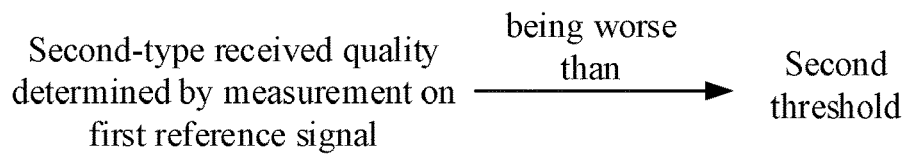
FIG. 9 illustrates a schematic diagram of a first reference signal according to one embodiment of the present disclosure.

Embodiment 9 illustrates a schematic diagram of a first reference signal according to one embodiment of the present disclosure, as shown in FIG. 9.

In embodiment 9, a second-type received quality determined by a measurement performed on the first reference signal is not worse than a second threshold.

In one embodiment, the first reference signal group comprises K1 reference signal(s), K1 being a positive integer; measurement(s) performed on the K1 reference signal(s) is(are respectively) used to determine K1 second-type received quality(qualities); and the K1 second-type received quality(qualities) is(are respectively) second-type received quality(qualities) corresponding to the K1 reference signal(s).

In one embodiment, the second reference signal group comprises K2 reference signal(s), K2 being a positive integer; measurement(s) performed on the K2 reference signal(s) is(are respectively) used to determine K2 second-type received quality(qualities); the K2 second-type received quality(qualities) is(are respectively) second-type received quality(qualities) corresponding to the K2 reference signal(s).

In one embodiment, a measurement performed on any reference signal in the first reference signal set is used to determine a second-type received quality.

In one embodiment, a measurement performed on any reference signal in the second reference signal set is used to determine a second-type received quality.

In one embodiment, a second-type received quality determined by a measurement performed on the second reference signal is not worse than a second threshold.

In one embodiment, for any given reference signal in the first reference signal set, a measurement performed on the given reference signal in a second time interval is used to determine a second-type received quality corresponding to the given reference signal.

In one embodiment, for any given reference signal in the first reference signal set, the first node obtains a measurement used to calculate a second-type received quality corresponding to the given reference signal only according to the given reference signal received within a second time interval.

In one embodiment, for any given reference signal in the second reference signal set, a measurement performed on the given reference signal in a third time interval is used to determine a second-type received quality corresponding to the given reference signal.

In one embodiment, for any given reference signal in the second reference signal set, the first node obtains a measurement used to calculate a second-type received quality corresponding to the given reference signal only according to the given reference signal received within a third time interval.

In one embodiment, the second time interval is a continuous duration.

In one embodiment, a length of the second time interval is equal to $T_{Evaluate\_CBD\_SSB}$ ms or $T_{Evaluate\_CBD\_CSI-RS}$ ms.

In one embodiment, the third time interval is a continuous duration.

In one embodiment, a length of the second time interval is equal to a length of the third time interval.

In one embodiment, a length of the second time interval is not equal to a length of the third time interval.

In one embodiment, a length of the third time interval is equal to $T_{Evaluate\_CBD\_SSB}$ ms or $T_{Evaluate\_CBD\_CSI-RS}$ ms.

In one embodiment, definitions of $T_{Evaluate\_CBD\_SSB}$ or $T_{Evaluate\_CBD\_CSI-RS}$ can be found in 3GPP TS38.133.

In one embodiment, the second-type received quality is RSRP.

In one embodiment, the second-type received quality is L1-RSRP.

In one embodiment, the second-type received quality is an SINR.

In one embodiment, the second-type received quality is an L1-SINR.

In one embodiment, the second-type received quality is a BLER.

In one embodiment, the second-type received quality is obtained by table looking-up RSRP, L1-RSRP, an SINR or an L1-SINR of a corresponding reference signal.

In one embodiment, a given reference signal is any reference signal in a given reference signal set, and a second-type received quality corresponding to the given reference signal is determined for a measurement performed on the given reference signal.

In one subembodiment of the above embodiment, the given reference signal set is the first reference signal set.

In one subembodiment of the above embodiment, the given reference signal set is the second reference signal set.

In one subembodiment of the above embodiment, RSRP or L1-RSRP of the given reference signal is used to determine a second-type received quality corresponding to the given reference signal.

In one subembodiment of the above embodiment, a second-type received quality corresponding to the given reference signal is equal to RSRP or L1-RSRP of the given reference signal.

In one subembodiment of the above embodiment, a second-type received quality corresponding to the given reference signal is equal to L1-RSRP after received power of the given reference signal is scaled according to a value indicated by a higher-layer parameter powerControlOffsetSS.

In one subembodiment of the above embodiment, an SINR or an L1-SINR of the given reference signal is used to determine a second-type received quality corresponding to the given reference signal.

In one subembodiment of the above embodiment, a second-type received quality corresponding to the given reference signal is equal to an SINR or an L1-SINR of the given reference signal.

In one subembodiment of the above embodiment, a second-type received quality corresponding to the given reference signal is equal to an L1-SINR after received power of the given reference signal is scaled according to a value indicated by a higher-layer parameter powerControlOffsetSS.

In one embodiment, the second threshold is a real number.

In one embodiment, the second threshold is a non-negative real number.

In one embodiment, the second threshold is a non-negative real number not greater than 1.

In one embodiment, the second threshold is equal to $Q_{in\_LR}$.

In one embodiment, the definition of $Q_{in\_LR}$ can be found in 3GPP TS38.133.

In one embodiment, the second threshold is configured by a higher-layer parameter rsrp-ThresholdSSB.

In one embodiment, the second threshold is configured by a higher-layer parameter rsrp-ThresholdCSI-RS.

In one embodiment, the meaning of the second-type received quality being not worse than the second threshold includes: the second-type received quality is one of RSRP, L1-RSRP, an SINR or an L1-SINR and the second-type received quality is greater than or equal to the second threshold.

In one embodiment, the meaning of the second-type received quality being not worse than the second threshold includes: the second-type received quality is a BLER and the second-type received quality is less than or equal to a second threshold.

In one embodiment, after receiving a request from a higher layer, a physical layer of the first node transmits a third information block to a higher layer; herein, the third information block indicates M1 reference signal(s) and M1 second-type received quality(qualities), and any of the M1 reference signal(s) is one in the first reference signal set, M1 being a positive integer; the M1 second-type received quality(qualities) is(are respectively) second-type received quality(qualities) corresponding to the M1 reference signal(s).

In one subembodiment of the above embodiment, M1 is equal to 1.

In one subembodiment of the above embodiment, M1 is greater than 1.

In one subembodiment of the above embodiment, any of the M1 second-type received quality(qualities) is not worse than the second threshold.

In one subembodiment of the above embodiment, the first reference signal is one of the M1 reference signal(s).

In one embodiment, after receiving a request from a higher layer, a physical layer of the first node transmits a fourth information block to a higher layer; herein, the fourth information block indicates M2 reference signal(s) and M2 second-type received quality(qualities), and any of the M2 reference signal(s) is one in the second reference signal set, M2 being a positive integer; the M2 second-type received quality(qualities) is(are respectively) second-type received quality(qualities) corresponding to the M2 reference signal(s).

In one subembodiment of the above embodiment, M2 is equal to 1.

In one subembodiment of the above embodiment, M2 is greater than 1.

In one subembodiment of the above embodiment, any of the M2 second-type received quality(qualities) is not worse than the second threshold.

In one subembodiment of the above embodiment, the second reference signal is one of the M2 reference signal(s).

Embodiment 10

Figure 10:
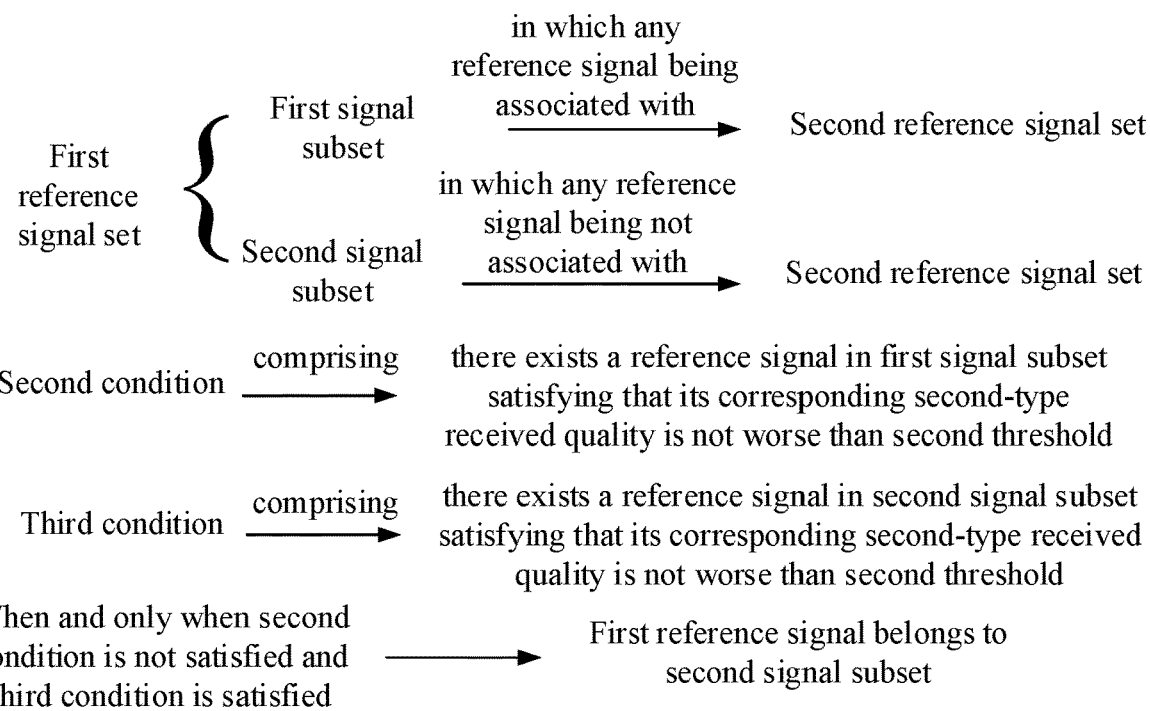
FIG. 10 illustrates a schematic diagram of a first reference signal according to another embodiment of the present disclosure.

Embodiment 10 illustrates a schematic diagram of a first reference signal according to another embodiment of the present disclosure, as shown in FIG. 10.

In embodiment 10, a first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold.

In one embodiment, when a second condition is satisfied, the first reference signal belongs to the first signal subset.

In one embodiment, the meaning of "any reference signal in the first signal subset being associated with the second reference signal set" includes: any reference signal in the first signal subset belongs to the second reference signal set.

In one embodiment, the meaning of "any reference signal in the first signal subset being associated with the second reference signal set" includes: a given reference signal is any reference signal in the first signal subset, and the given reference signal and a reference signal in the second reference signal set are QCL.

In one embodiment, the meaning of "any reference signal in the first signal subset being associated with the second reference signal set" includes: any reference signal in the first signal subset belongs to the second reference signal set or is QCL with a reference signal in the second reference signal set.

In one embodiment, the meaning of "any reference signal in the first signal subset being associated with the second reference signal set" includes: a given reference signal is any reference signal in the first signal subset, and the given reference signal and a reference signal in the second reference signal set are QCL with a same reference signal.

In one embodiment, the meaning of "any reference signal in the second signal subset being not associated with the second reference signal set" includes: any reference signal in the second signal subset does not belong to the second reference signal set.

In one embodiment, the meaning of "any reference signal in the second signal subset being not associated with the second reference signal set" includes: any reference signal in the second signal subset and any reference signal in the second reference signal set are not QCL.

In one embodiment, the meaning of "any reference signal in the second signal subset being not associated with the second reference signal set" includes: any reference signal in the second signal subset and any reference signal in the second reference signal se are QCL with different reference signals.

Embodiment 11

Figure 11:
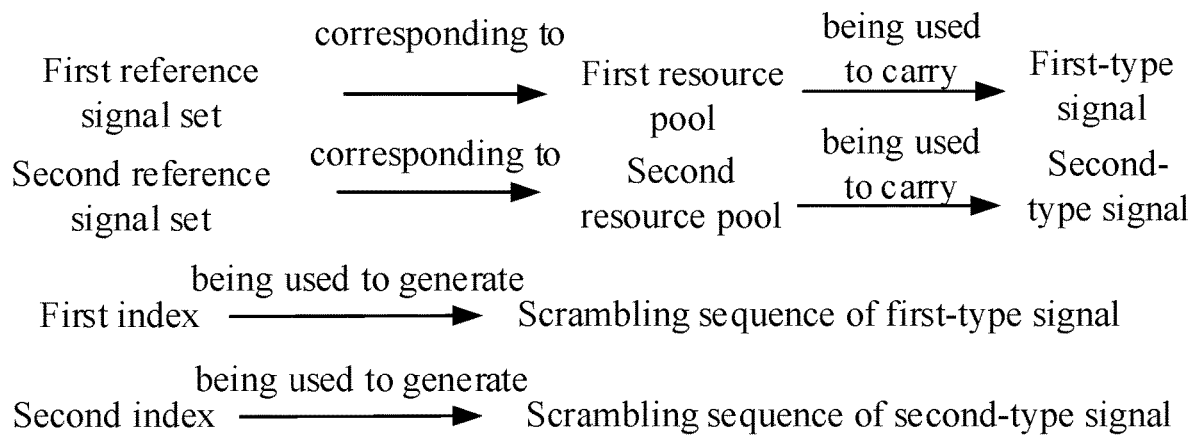
FIG. 11 illustrates a schematic diagram of a first resource pool and a second resource pool according to one embodiment of the present disclosure.

Embodiment 11 illustrates a schematic diagram of a first resource pool and a second resource pool according to one embodiment of the present disclosure, as shown in FIG. 11.

In embodiment 11, the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

In one embodiment, a first-type signal carries a first bit block, and a first bit sequence comprises an output of bits in the first bit block after sequentially through CRC Attachment, Code Block Segmentation, Code Block CRC Attachment, Channel Coding, Rate Matching and Concatenation; the first bit sequence is scrambled by the scrambling sequence of the first-type signal to obtain a second bit sequence; and the second bit sequence is used to generate the a first-type signal.

In one subembodiment of the above embodiment, the first-type signal comprises an output after bits in the second bit sequence are sequentially through Modulation, Layer Mapping, Antenna Port Mapping, Mapping to Virtual Resource Blocks, Mapping from Virtual to Physical Resource Blocks, multicarrier symbol generation, and modulation and upconversion.

In one embodiment, the first bit block is one of a Transport Block (TB), a Code Block (CB) or a Code Block Group (CBG).

In one embodiment, the scrambling sequence of the first-type signal comprises more than one binary bit.

In one embodiment, the scrambling sequence of the first-type signal is a binary bit sequence.

In one embodiment, the scrambling sequence of the first-type signal is a pseudo-random sequence.

In one embodiment, the scrambling sequence of the first-type signal is generated according to a method in section 5.2.1, 3GPP TS38.211.

In one embodiment, a second-type signal carries a second bit block, and a third bit sequence comprises an output of bits in the second bit block after sequentially through CRC Attachment, Code Block Segmentation, Code Block CRC Attachment, Channel Coding, Rate Matching and Concatenation; the third bit sequence is scrambled by the scrambling code sequence of the a second-type signal to obtain a fourth bit sequence; and the fourth bit sequence is used to generate the a second-type signal.

In one subembodiment of the above embodiment, the second-type signal comprises an output after bits in the fourth bit sequence are sequentially through Modulation, Layer Mapping, Antenna Port Mapping, Mapping to Virtual Resource Blocks, Mapping from Virtual to Physical Resource Blocks, multicarrier symbol generation, and modulation and upconversion.

In one embodiment, the second bit block is one of a Transport Block (TB), a Code Block (CB) or a Code Block Group (CBG).

In one embodiment, the scrambling sequence of the second-type signal comprises more than one binary bit.

In one embodiment, the scrambling sequence of the second-type signal is a binary bit sequence.

In one embodiment, the scrambling sequence of the second-type signal is a pseudo-random sequence.

In one embodiment, the scrambling sequence of the second-type signal is generated according to a method in 3GPP TS38.211, section 5.2.1.

In one embodiment, the first reference signal set is configured for unicast service, and the second reference signal set is configured for unicast service.

In one embodiment, the meaning of the phrase of "the first reference signal set corresponding to a first resource pool" includes: a radio signal on the first resource pool and at least one reference signal in the first reference signal set are QCL; and the meaning of the phrase of "the second reference signal set corresponding to a second resource pool" includes: a radio signal on the second resource pool and at least one reference signal in the second reference signal set are QCL.

In one embodiment, the meaning of the phrase of "the first reference signal set corresponding to a first resource pool" includes: the first reference signal set is configured for the first resource pool; and the meaning of the phrase of "the second reference signal set corresponding to a second resource pool" includes: the second reference signal set is configured for the second resource pool.

In one embodiment, the meaning of the phrase of "the first reference signal set corresponding to a first resource pool" includes: the first reference signal set is configured for a BFR used on the first resource pool; and the meaning of the phrase of "the second reference signal set corresponding to a second resource pool" includes: the second reference signal set is configured for a BFR used on the second resource pool.

In one embodiment, the meaning of the phrase of "the first reference signal set corresponding to a first resource pool" includes: the first resource pool is used for transmission of unicast service, and the first reference signal set is configured for unicast service; and the meaning of the phrase of "the second reference signal set corresponding to a second resource pool" includes: the second resource pool is used for transmission of multicast service, and the second reference signal set is configured for unicast service.

In one embodiment, the first resource pool occupies at least one RE in the time-frequency domain.

In one embodiment, the first resource pool occupies at least one symbol in time domain.

In one embodiment, the first resource pool occupies at least one PRB in frequency domain.

In one embodiment, the first resource pool comprises at least one search space set.

In one embodiment, the first resource pool comprises a plurality of PDCCH candidates.

In one embodiment, the first resource pool comprises partial PDCCH candidates in a search space set.

In one embodiment, the second resource pool comprises at least one CORESET.

In one embodiment, the second resource pool occupies at least one RE in time-frequency domain.

In one embodiment, the second resource pool occupies at least one symbol in time domain.

In one embodiment, the second resource pool occupies at least one PRB in frequency domain.

In one embodiment, the second resource pool comprises at least one search space set.

In one embodiment, the second resource pool comprises a plurality of PDCCH candidates.

In one embodiment, the second resource pool comprises partial PDCCH candidates in a search space set.

In one embodiment, the second resource pool comprises at least one CORESET.

In one embodiment, the first resource set belongs to the first resource pool.

In one embodiment, the second resource set belongs to the second resource pool.

In one embodiment, the second resource set belongs to the first resource pool.

In one embodiment, the first resource pool is used to carry a first-type signaling, and the second resource pool is used to carry a second-type signaling.

In one embodiment, a first-type signaling is used to indicate scheduling information of a first-type signal, and a second-type signaling is used to indicate scheduling information of a second-type signal.

In one embodiment, the first resource pool and the second resource pool are respectively used for different types of logical channels.

In one embodiment, a logical channel for which a first resource pool is used comprises a DCCH.

In one embodiment, a logical channel for which the first resource pool is used comprises a CCCH.

In one embodiment, a logical channel for which the first resource pool is used comprises a DTCH.

In one embodiment, a logical channel for which the first resource pool is used comprises an MCCH.

In one embodiment, a logical channel for which the first resource pool is used comprises an MTCH.

In one embodiment, the first resource pool and the second resource pool are used for different transport channels.

In one embodiment, a transport channel for which the first resource pool is used comprises a DL-SCH.

In one embodiment, a transport channel for which the second resource pool is used comprises an MCH.

In one embodiment, a transport channel for which the second resource pool is used comprises an SC-MCH.

In one embodiment, the first-type signal and the second-type signal correspond to different radio bearers.

In one embodiment, a CRC of a scheduling signaling of the first-type signal and a CRC of a scheduling signaling of the second-type signal are scrambled by different RNTIs.

In one embodiment, a CRC of a scheduling signaling of the first-type signal is scrambled by an RNTI in a third ID set, and a CRC of a scheduling signaling of the second-type signal is scrambled by an RNTI in a fourth ID set; and the third identifier set and the fourth identifier set respectively comprise at least one RNTI.

In one embodiment, the first-type signal comprises a UE-dedicated higher-layer signaling; and the second-type signal comprises a group common higher-layer signaling.

In one embodiment, the first-type signal and the second-type signal occupy different types of logical channels.

In one embodiment, a logical channel occupied by the first-type signal comprises a DCCH.

In one embodiment, a logical channel occupied by the first-type signal comprises a CCCH.

In one embodiment, a logical channel occupied by the first-type signal comprises a DTCH.

In one embodiment, a logical channel occupied by the second-type signal comprises an MCCH.

In one embodiment, a logical channel occupied by the second-type signal comprises an MTCH.

In one embodiment, the first-type signal and the second-type signal occupy different types of transport channels.

In one embodiment, a transport channel occupied by the first-type signal comprises a DL-SCH.

In one embodiment, a logical channel occupied by the second-type signal comprises an MCH.

In one embodiment, a logical channel occupied by the second-type signal comprises an SC-MCH.

In one embodiment, the first index and the second index are respectively non-negative integers.

In one embodiment, the first index is an RNTI, and the second index is an RNTI.

In one embodiment, the first index corresponds to a first RNTI and the second index corresponds to a second RNTI; the first RNTI is not equal to the second RNTI.

In one embodiment, the first index is equal to the first RNTI and the second index is equal to the second RNTI.

In one embodiment, the first RNTI is used to generate the first index, and the second RNTI is used to generate the second index.

In one embodiment, the first RNTI is a UE specific RNTI.

In one embodiment, the second RNTI is a UE specific RNTI.

In one embodiment, the second RNTI is a group common RNTI.

In one embodiment, the first RNTI is a C-RNTI.

In one embodiment, the second RNTI is one of a G-RNTI, an M-RNTI, a GC-RNTI or an SC-PTM-RNTI.

In one embodiment, the first RNTI belongs to the first identifier set.

In one embodiment, the second RNTI belongs to the second identifier set.

In one embodiment, the second RNTI does not belong to the second identifier set.

In one embodiment, the first RNTI is an RNTI used to scramble a CRC of the first-type signaling.

In one embodiment, the second RNTI is an RNTI used to scramble a CRC of the second-type signaling.

In one embodiment, the second RNTI is different from an RNTI used to scramble a CRC of the second-type signaling.

In one embodiment, the first index and the second index are both configured by a higher layer parameter.

In one embodiment, the first index and the second index are both configured by an RRC parameter.

Embodiment 12

Figure 12:
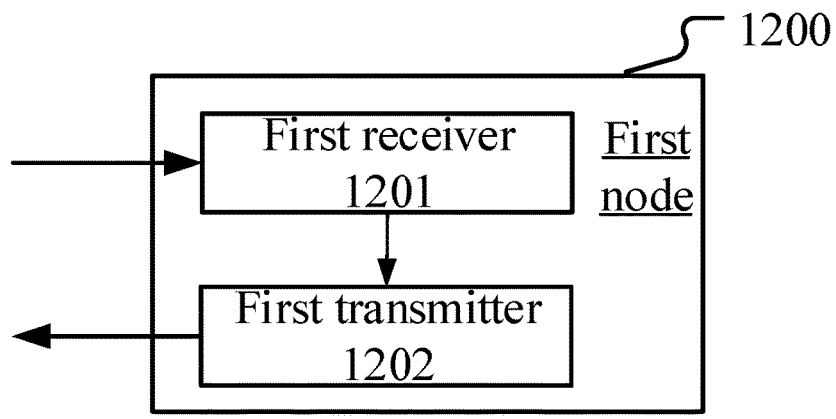
FIG. 12 illustrates a structure block diagram of a processing device in a first node according to one embodiment of the present disclosure.

Embodiment 12 illustrates a structure block diagram of a processing device in a first node according to one embodiment of the present disclosure, as shown in FIG. 12. In FIG. 12, a processing device 1200 in a first node comprises a first receiver 1201 and a first transmitter 1202.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460, or the data source 467 in Embodiment 4.

The first receiver 1201: receives a first reference signal group; and maintains a first counter; and the first transmitter 1202: transmits a target signal;

in embodiment 12, a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold.

In one embodiment, in response to the behavior of transmitting a target signal, the first receiver 1201 monitors a first-type signaling in a first resource set starting from the first time; herein, for the monitoring of the first-type signaling in the first resource set starting from the first time, the first node assumes same QCL parameter(s) as the first reference signal; time-domain resources occupied by the first signal are used to determine the first time.

In one embodiment, the first receiver 1201 receives a first target signaling, the first target signaling is used to determine a second time; in response to the behavior of receiving the first target signaling, the first receiver 1201 stops monitoring the first-type signaling in the first resource set after the second time.

In one embodiment, in response to the behavior of transmitting a target signal, the first receiver 1201 monitors a second-type signaling in a second resource set starting from the third time; herein, for the monitoring of the second-type signaling in the second resource set starting from the third time, the first node assumes same QCL parameter(s) as the second reference signal.

In one embodiment, the first receiver 1201 receives a second target signaling, and the second target signaling is used to determine a fourth time; in response to the behavior of receiving the second target signaling, the first receiver 1201 monitors the second-type signaling in the second resource set after the fourth time.

In one embodiment, the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

Embodiment 13

Figure 13:
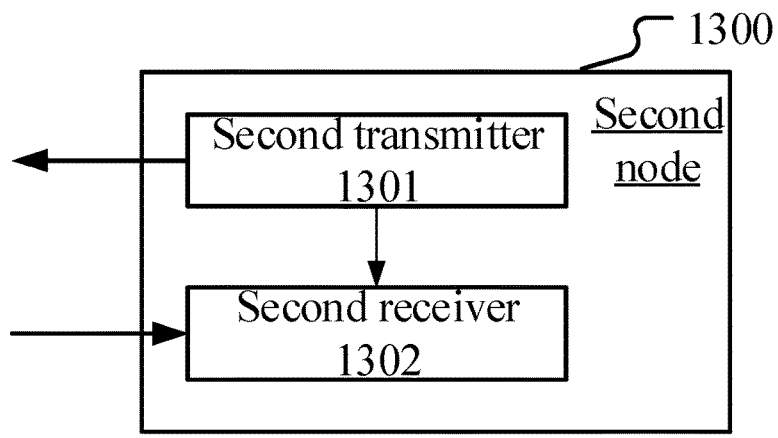
FIG. 13 illustrates a structure block diagram of a processing device in a second node according to one embodiment of the present disclosure.

Embodiment 13 illustrates a structure block diagram of a processing device in a second node according to one embodiment of the present disclosure, as shown in FIG. 13. In FIG. 13, a processing device 1300 in a second node comprises a second transmitter 1301 and a second receiver 1302.

In one embodiment, the second node is a base station.

In one embodiment, the second node is a UE.

In one embodiment, the second node is a relay node.

In one embodiment, the second transmitter 1301 comprises at least one of the antenna 420, the transmitter 418, the transmitting processor 416, the multi-antenna transmitting processor 471, the controller/processor 475, or the memory 476 in Embodiment 4.

In one embodiment, the second receiver 1302 comprises at least one of the antenna 420, the receiver 418, the receiving processor 470, the multi-antenna receiving processor 472, the controller/processor 475, the memory 476 in Embodiment 4.

The second transmitter 1301, transmits a first reference signal group; and
the second receiver 1302, receives a target signal;
in embodiment 13, a measurement on the first reference signal group is used to determine a first-type received quality group, and the first-type received quality group is used by a transmitter of the target signal to maintain a first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; the first condition comprises: the first reference signal being associated with the second reference signal set.

In one embodiment, the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold.

In one embodiment, the second transmitter 1301 transmits a first-type signaling in a first resource set starting from a first time; herein, the transmitter of the target signal monitors the first-type signaling in the first resource set starting from the first time; for the monitoring of the first-type signaling in the first resource set starting from the first time, the transmitter of the target signal assumes same QCL parameter(s) as the first reference signal; time-domain resources occupied by the first signal are used to determine the first time.

In one embodiment, the second transmitter 1301 transmits a first target signaling, and the first target signaling is used to determine a second time; and the second transmitter 1301 stops transmitting the first-type signaling in the first resource set after the second time.

In one embodiment, the second transmitter 1301 transmits a second-type signaling in a second resource set starting from a third time; herein, a transmitter of the target signal monitors the second-type signaling in the second resource set starting from the third time; for the monitoring of the second-type signaling in the second resource set starting from the third time, the transmitter of the target signal adopts same QCL parameter(s) as the second reference signal.

In one embodiment, the second transmitter 1301 transmits a second target signaling, and the second target signaling is used to determine a fourth time; the second transmitter 1301 stops transmitting the second-type signaling in the second resource set after the fourth time.

In one embodiment, the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first information block; receiving a second information block; receiving a first reference signal group; herein, the first information block being used to indicate the first reference signal group, the second information block being used to indicate a first reference signal set and a second reference signal set; maintaining a first counter; and
a first transmitter, transmitting a target signal;
wherein a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to the first reference signal set; the second signal is used to determine a second reference signal, and the second reference signal belongs to the second reference signal set; and the first condition comprises: the first reference signal being associated with the second reference signal set.

2. The first node according to claim 1, wherein the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold;
or, the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

3. The first node according to claim 1, wherein in response to transmitting a target signal, the first receiver monitors a first-type signaling in a first resource set starting from a first time; wherein for the monitoring of the first-type signaling in the first resource set starting from the first time, the first node assumes same QCL (Quasi Co-Location) parameter(s) as the first reference signal; time-domain resources occupied by the first signal are used to determine the first time.

4. The first node according to claim 3, wherein the first receiver receives a first target signaling, and the first target signaling is used to determine a second time; in response to receiving the first target signaling, the first receiver stops monitoring the first-type signaling in the first resource set after the second time;
or, in response to transmitting a target signal, the first receiver monitors a second-type signaling in a second resource set starting from the third time; wherein for the monitoring of the second-type signaling in the second resource set starting from the third time, the first node assumes same QCL parameter(s) as the second reference signal.

5. The first node according to claim 3, wherein in response to transmitting a target signal, the first receiver monitors a second-type signaling in a second resource set starting from a third time; the first receiver receives a second target signaling, the second target signaling is used to determine a fourth time; in response to receiving the second target signaling, the first receiver stop monitoring the second-type signaling in the second resource set after the fourth time; wherein for the monitoring of the second-type signaling in the second resource set starting from the third time, the first node assumes same QCL parameter(s) as the second reference signal.

6. A second node for wireless communications, comprising:
a second transmitter, transmitting a first reference signal group; and
a second receiver, receiving a target signal;
wherein a measurement on the first reference signal group is used to determine a first-type received quality group, and the first-type received quality group is used by a transmitter of the target signal to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; a first information block is used to indicate the first reference signal group, and a second information block is used to indicate the first reference signal set and the second reference signal set; and the first condition comprises: the first reference signal being associated with the second reference signal set.

7. The second node according to claim 6, wherein the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold;
or, the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

8. The second node according to claim 6, wherein the second transmitter transmits a first-type signaling in a first resource set starting from a first time; wherein the transmitter of the target signal monitors the first-type signaling in the first resource set starting from the first time; for the monitoring of the first-type signaling in the first resource set starting from the first time, the transmitter of the target signal assumes same QCL (Quasi Co-Location) parameter(s) as the first reference signal; and time-domain resources occupied by the first signal are used to determine the first time.

9. The second node according to claim 8, wherein the second transmitter transmits a first target signaling, and the first target signaling is used to determine a second time; and stops transmitting the first-type signaling in the first resource set after the second time;
or, the second transmitter transmits a second-type signaling in a second resource set starting from a third time;
wherein the transmitter of the target signal monitors the second-type signaling in the second resource set starting from the third time; for the monitoring of the second-type signaling in the second resource set starting from the third time, the transmitter of the target signal adopts same QCL parameter(s) as the second reference signal.

10. The second node according to claim 8, wherein the second transmitter transmits a second-type signaling in a second resource set starting from a third time; the second transmitter transmits a second target signaling, and the second target signaling is used to determine a fourth time; the second transmitter stops transmitting the second-type signaling in the second resource set after the fourth time; wherein the transmitter of the target signal monitors the second-type signaling in the second resource set starting from the third time; for the monitoring of the second-type signaling in the second resource set starting from the third time, the transmitter of the target signal adopts same QCL parameter(s) as the second reference signal.

11. A method in a first node for wireless communications, comprising:
receiving a first information block;
receiving a second information block;
receiving a first reference signal group; herein, the first information block being used to indicate the first reference signal group, the second information block being used to indicate a first reference signal set and a second reference signal set;
maintaining a first counter; and
transmitting a target signal;
wherein a measurement on the first reference signal group is used to determine a first-type received quality group, and the first-type received quality group is used to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to the first reference signal set; the second signal is used to determine a second reference signal, and the second reference signal belongs to the second reference signal set; the first condition comprises: the first reference signal being associated with the second reference signal set.

12. The method according to claim 11, wherein the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than a second threshold;
or, the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

13. The method according to claim 11, comprising:
in response to transmitting a target signal, monitoring a first-type signaling in a first resource set starting from a first time;
wherein for the monitoring of the first-type signaling in the first resource set starting from the first time, the first node assumes same QCL (Quasi Co-Location) parameter(s) as the first reference signal; time-domain resources occupied by the first signal are used to determine the first time.

14. The method according to claim 13, comprising:
receiving a first target signaling, the first target signaling being used to determine a second time;
in response to receiving the first target signaling, stopping monitoring the first-type signaling in the first resource set after the second time;
or, in response to transmitting a target signal, monitoring a second-type signaling in a second resource set starting from a third time; wherein for the monitoring of the second-type signaling in the second resource set starting from the third time, the first node assumes same QCL parameter(s) as the second reference signal.

15. The method according to claim 13, comprising:
in response to transmitting a target signal, monitoring a second-type signaling in a second resource set starting from a third time;
receiving a second target signaling, the second target signaling being used to determine a fourth time; and
in a response to receiving the second target signaling, stopping monitoring the second-type signaling in the second resource set after the fourth time;
wherein for the monitoring of the second-type signaling in the second resource set starting from the third time, the first node assumes same QCL parameter(s) as the second reference signal.

16. A method in a second node for wireless communications, comprising:
- transmitting a first reference signal group; and
- receiving a target signal;
- wherein a measurement on the first reference signal group is used to determine a first-type received quality group, and the first-type received quality group is used by a transmitter of the target signal to maintain the first counter; in response to a value of the first counter being not less than a first threshold, the target signal is triggered; the target signal comprises a first signal; when a first condition is not satisfied, the target signal comprises a second signal; when the first condition is satisfied, the target signal does not comprise the second signal; the first signal is used to determine a first reference signal, and the first reference signal belongs to a first reference signal set; the second signal is used to determine a second reference signal, and the second reference signal belongs to a second reference signal set; a first information block is used to indicate the first reference signal group, and a second information block is used to indicate the first reference signal set and the second reference signal set; the first condition comprises: the first reference signal being associated with the second reference signal set.

17. The method according to claim 16, wherein the first reference signal set comprises a first signal subset and a second signal subset; any reference signal in the first signal subset is associated with the second reference signal set, and any reference signal in the second signal subset is not associated with the second reference signal set; when and only when a second condition is not satisfied and a third condition is satisfied, the first reference signal belongs to the second signal subset; the second condition comprises: there exists a reference signal in the first signal subset satisfying that its corresponding second-type received quality is not worse than a second threshold, and the third condition comprises: there exists a reference signal in the second signal subset satisfying that its corresponding second-type received quality is not worse than the second threshold;
- or, the first reference signal set corresponds to a first resource pool, and the second reference signal set corresponds to a second resource pool; the first resource pool is used to carry a first-type signal; the second resource pool is used to carry a second-type signal; a first index is used to generate a scrambling sequence of the first-type signal, and a second index is used to generate a scrambling sequence of the second-type signal; the first index is not equal to the second index, the first index is an integer, and the second index is an integer.

18. The method according to claim 16, comprising:
- transmitting a first-type signaling in a first resource set starting from a first time;
- wherein the transmitter of the target signal monitors the first-type signaling in the first resource set starting from the first time; for the monitoring of the first-type signaling in the first resource set starting from the first time, the transmitter of the target signal assumes same QCL (Quasi Co-Location) parameter(s) as the first reference signal; and time-domain resources occupied by the first signal are used to determine the first time.

19. The method according to claim 18, comprising:
- transmitting a first target signaling, the first target signaling being used to determine a second time;
- stopping transmitting the first-type signaling in the first resource set after the second time;
- or, comprising:
- transmitting a second-type signaling in a second resource set starting from a third time;
- wherein the transmitter of the target signal monitors the second-type signaling in the second resource set starting from the third time; for the monitoring of the second-type signaling in the second resource set starting from the third time, the transmitter of the target signal adopts same QCL parameter(s) as the second reference signal.

20. The method according to claim 18, comprising:
- transmitting a second-type signaling in a second resource set starting from a third time;
- transmitting a second target signaling, the second target signaling being used to determine a fourth time; and
- stopping transmitting the second-type signaling in the second resource set after the fourth time;
- wherein the transmitter of the target signal monitors the second-type signaling in the second resource set starting from the third time; for the monitoring of the second-type signaling in the second resource set starting from the third time, the transmitter of the target signal adopts same QCL parameter(s) as the second reference signal.

* * * * *